United States Patent
Matsumura et al.

(10) Patent No.: US 9,600,750 B2
(45) Date of Patent: Mar. 21, 2017

(54) PRINTING CONTROL DEVICE AND PRINTING CONTROL METHOD

(71) Applicant: SEIKO EPSON CORPORATION, Tokyo (JP)

(72) Inventors: Tetsuya Matsumura, Nagano (JP); Yasutoshi Takeuchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/191,617

(22) Filed: Jun. 24, 2016

(65) Prior Publication Data
US 2017/0004390 A1 Jan. 5, 2017

(30) Foreign Application Priority Data
Jul. 2, 2015 (JP) .................................. 2015-133888

(51) Int. Cl.
*B41J 2/21* (2006.01)
*G06K 15/02* (2006.01)
*G06K 15/10* (2006.01)

(52) U.S. Cl.
CPC ........ *G06K 15/1881* (2013.01); *B41J 2/2103* (2013.01); *G06K 15/102* (2013.01); *G06K 15/1878* (2013.01); *G06K 15/107* (2013.01)

(58) Field of Classification Search
CPC ........... G06K 15/1881; G06K 15/1878; G06K 15/102; G06K 15/105; G06K 15/107; B41J 2/2103
See application file for complete search history.

(56) References Cited

U.S. PATENT DOCUMENTS 6,755,506 B2 * 6/2004 Nishikori ............... B41J 2/2103
347/40
2011/0090538 A1 * 4/2011 Ishikawa .............. G06K 15/107
358/3.14

FOREIGN PATENT DOCUMENTS

JP 2010-194737 A 9/2010
JP 2014-113708 A 6/2014

* cited by examiner

*Primary Examiner* — Thinh H Nguyen
(74) *Attorney, Agent, or Firm* — Global IP Counselors, LLP

(57) ABSTRACT

Main scanning performed two times by interposing sub-scanning of a distance longer than a pitch of nozzles of s nozzle line in the sub-scanning direction is referred to as first main scanning and second main scanning, a region in which a print image is formed at s time of the first main scanning is referred to as a first print region, and a region in which the print image is formed at a time of the second main scanning is referred to as a second print region. A printing control device for a printing unit (printing apparatus) includes a record density acquisition unit that acquires record density of the print image in a determination region including at least a part of the first print region based on the print data; and a sub-scanning control unit that changes an overlap between the first and second print regions in the sub-scanning direction.

9 Claims, 15 Drawing Sheets

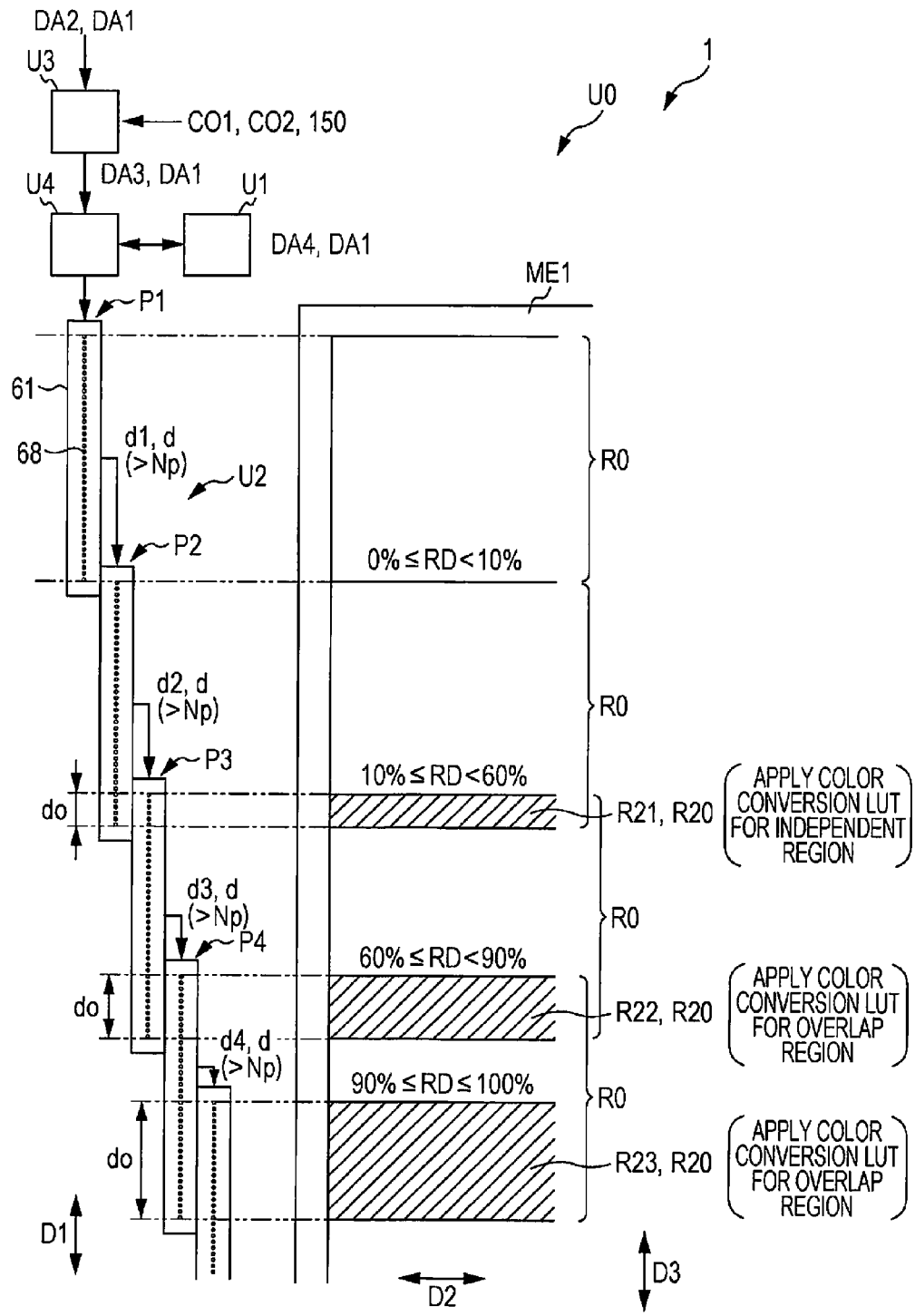

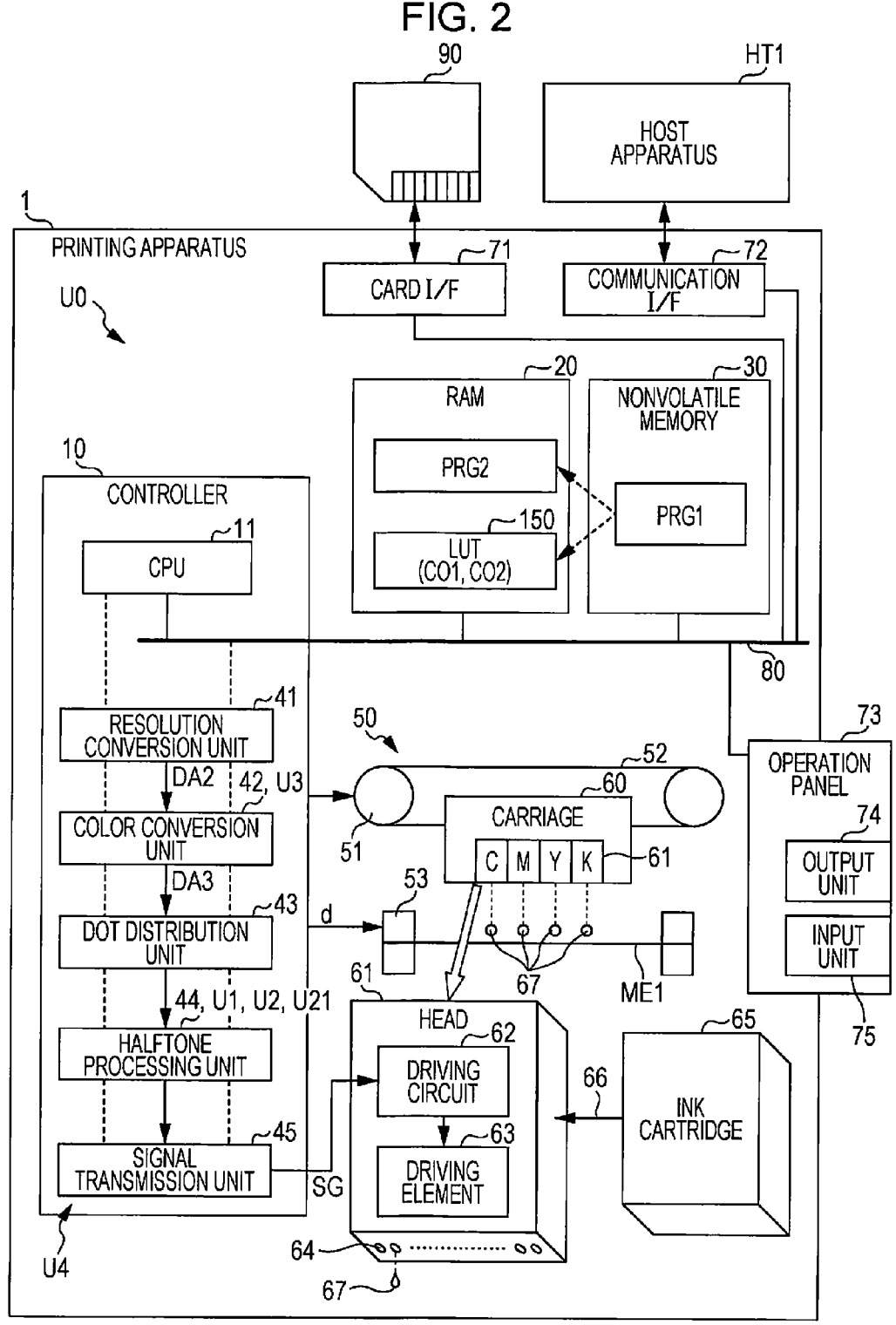

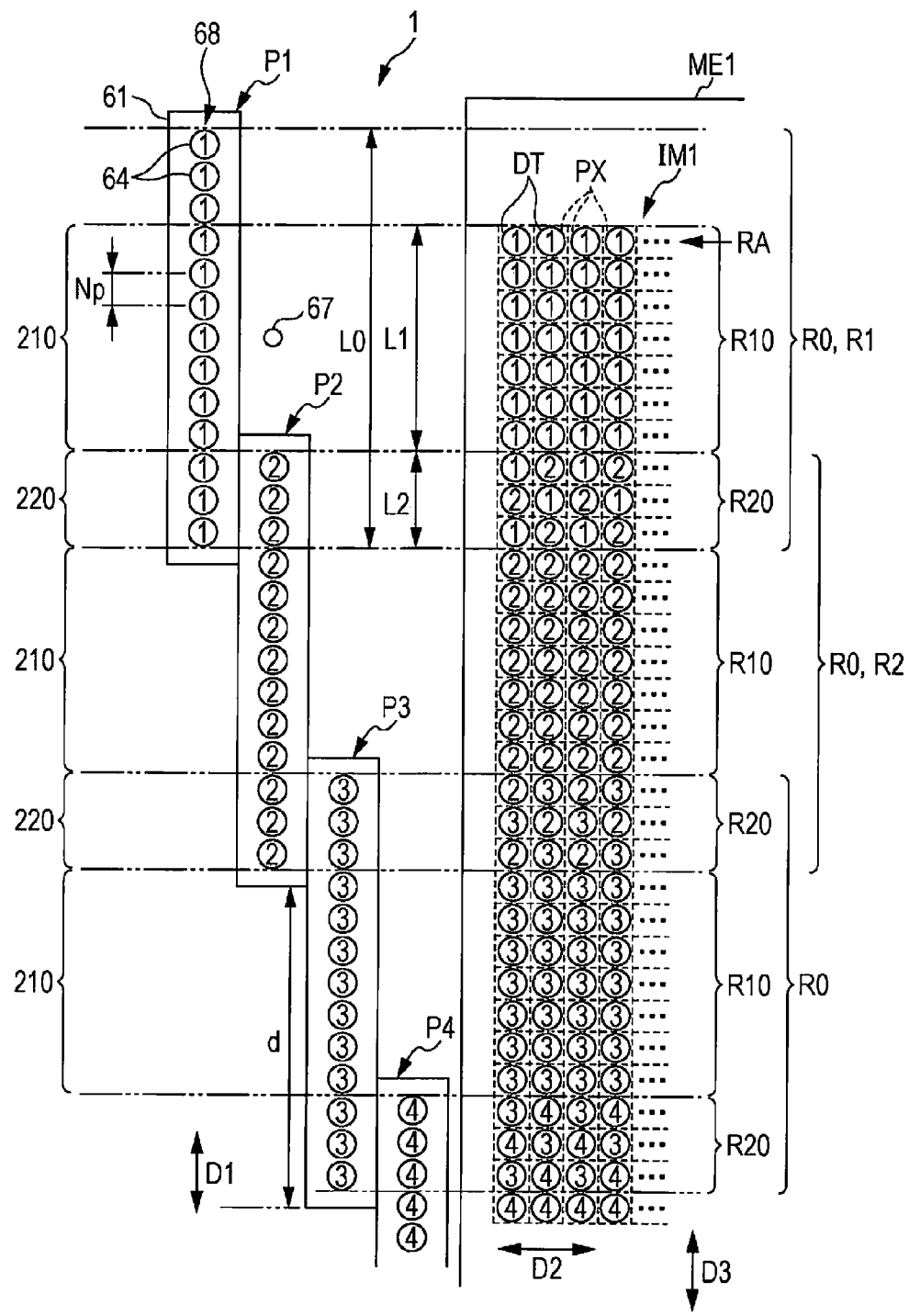

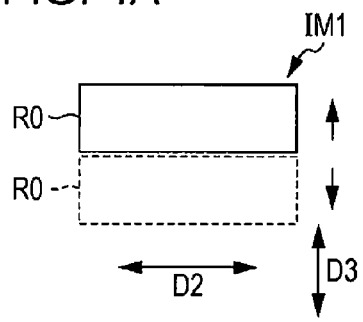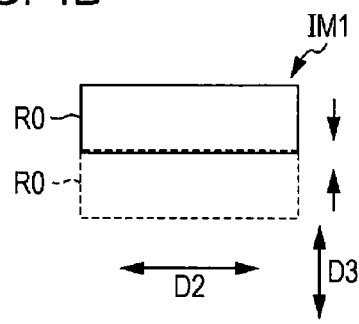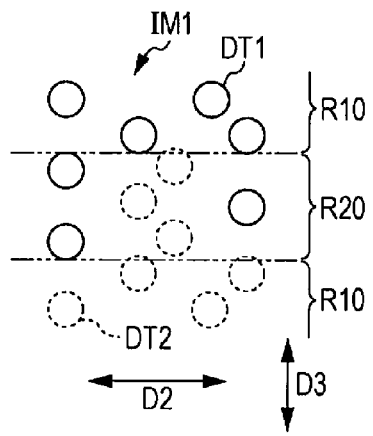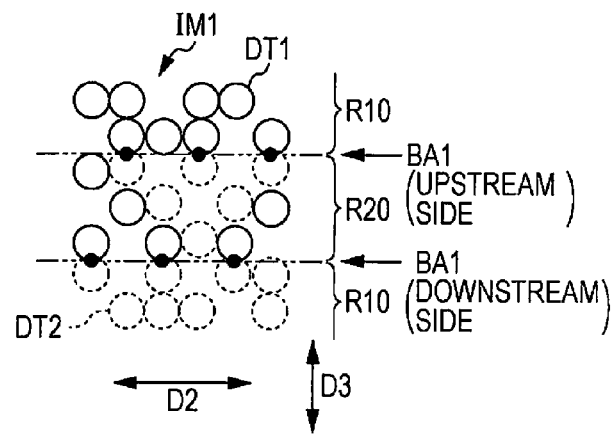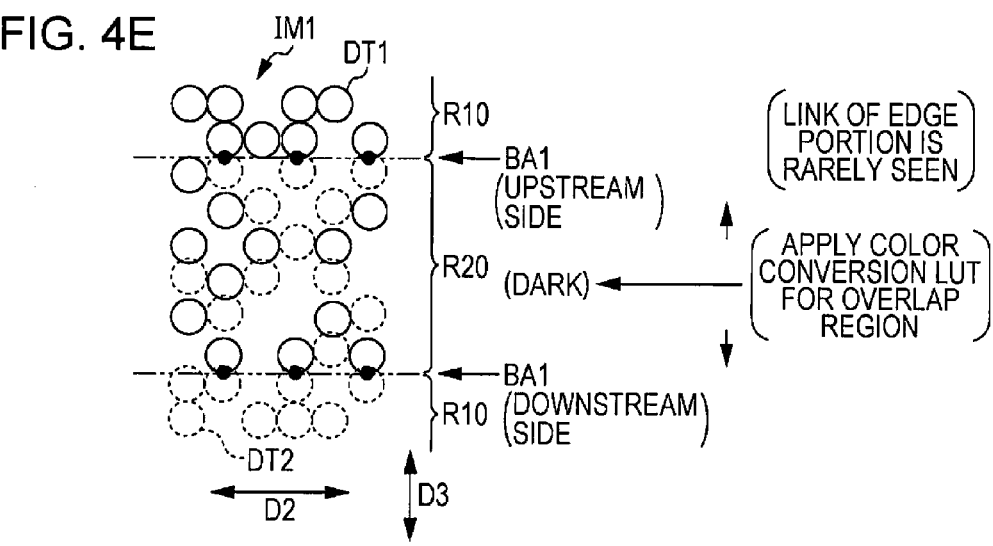

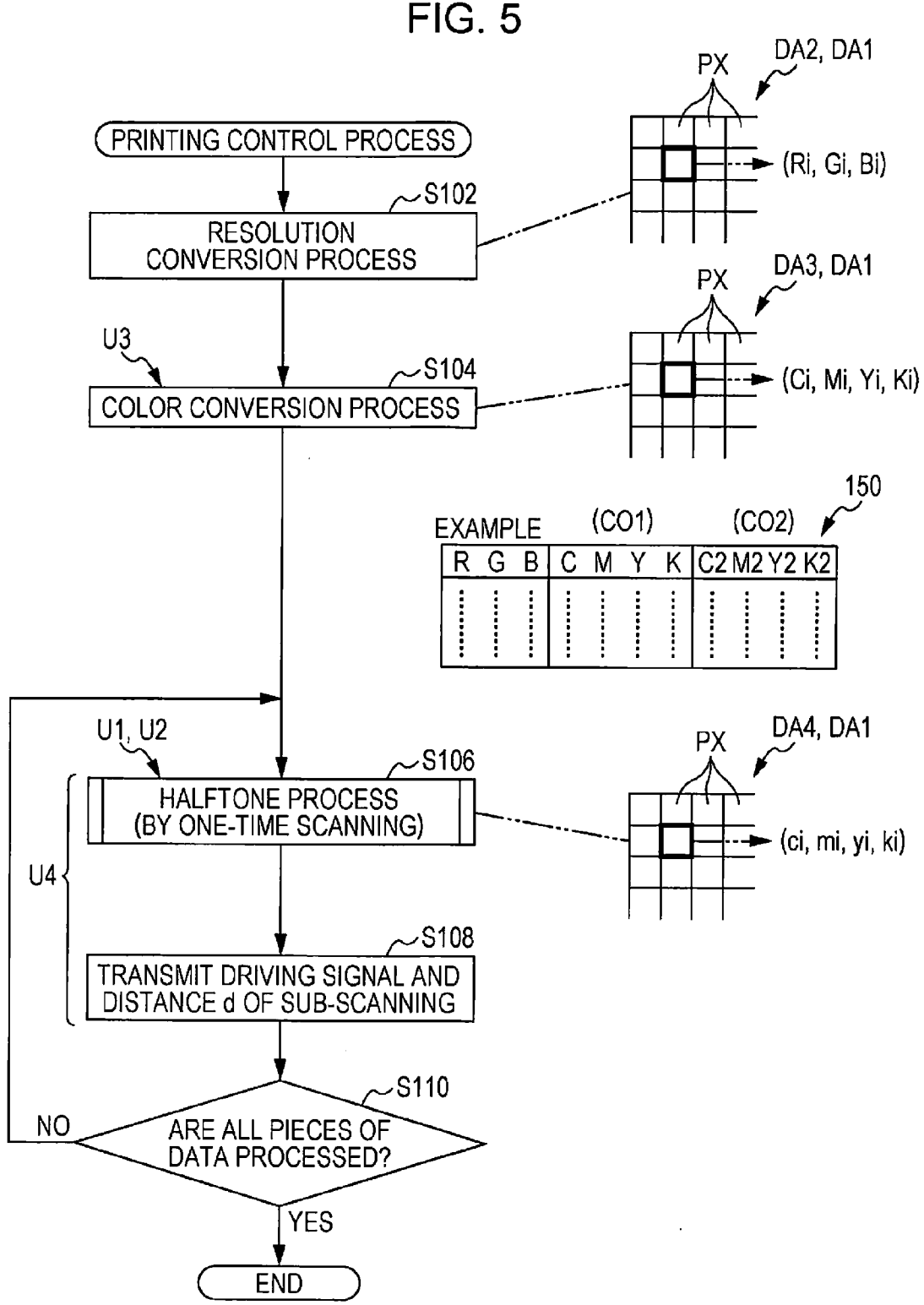

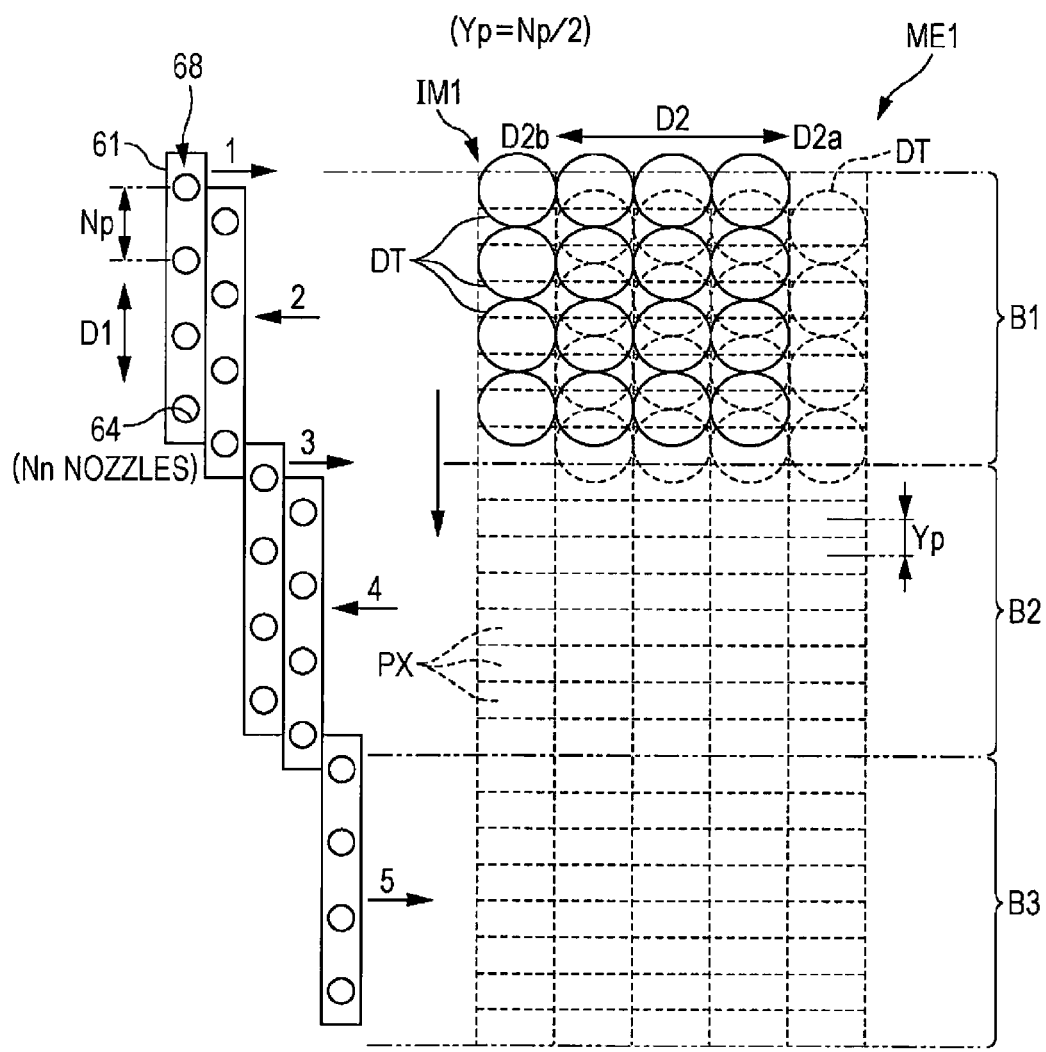

PRINTING CONTROL DEVICE AND PRINTING CONTROL METHOD

BACKGROUND

1. Technical Field

The present invention relates to a printing control device and a printing control method.

2. Related Art

Ink jet printers, for example, dots are formed on print substrates by relatively moving the print substrates and nozzle lines in which a plurality of nozzles are arranged in a predetermined nozzle line direction in relative movement directions intersecting the nozzle arrangement directions and ejecting ink droplets (liquid droplets) from the nozzles according to nozzle data that indicates presence or absence of an ink dot for each pixel. Ink jet printers in which main scanning and sub-scanning are repeated include, for example, serial printers in which high-speed printing such as band printing is performed and serial printers in which pseudo-band printing is performed. Here, the band printing is a printing scheme of forming all of the dots of a band having a length corresponding to a one-time feed amount (also referred to as a transport amount) of a print substrate in a sub-scanning direction through one-time main scanning. The pseudo-band printing is a printing scheme of forming all of the dots of a band, which is a unit in which all of the dots are formed in a sub-scanning direction, through M-time main scanning (where M is an integer equal to or greater than 2). Sub-scanning between main scanning at the time of formation of dots of equal bands is a feed amount corresponding to 1/M of a pitch of nozzles in a sub-scanning direction.

There is a possibility of banding (stripes formed in a main scanning direction) occurring in boundaries of bands due to a transport error of a print substrate or a landing error of dots between the bands. To reduce the banding, partial overlap printing is performed in which print regions, where print images are formed at the time of main scanning performed before and after sub-scanning of a distance longer than a pitch of nozzles in a sub-scanning direction, are partially overlapped. In the partial overlap printing, recording of the overlapped overlap regions is divided into main scanning before the sub-scanning and main scanning after the sub-scanning. The number of nozzles recording the overlap regions among the nozzles included in nozzle lines is not changed irrespective of the number of times the main scanning is performed.

JP-A-2014-113708 discloses an image forming apparatus that includes an ink jet recording head. In the image forming apparatus, all of the nozzles of a link portion in which the end of a recording head overlaps at the time of scanning performed so that the end of the recording head overlaps are used and the sizes of ink droplets in the link portion are set to be smaller than the sizes of ink droplets in a portion other than the link portion so that an image density of the link portion is not changed. The number of nozzles included in the link portion among the nozzles included in the recording head is not changed irrespective of the number of times the main scanning is performed.

In the image forming apparatus, it is necessary to change the sizes of the ink droplets in order to form an image including the link portion and there is a possibility of banding being viewed due to a difference in the sense of granularity of ink dots between the link portion and a non-link portion depending on a print substrate. On the other hand, it is suitable that a printing speed can be improved.

The foregoing problems similarly occur in various apparatuses.

SUMMARY

An advantage of some aspects of the invention is that it provides a technology for improving a printing speed while suppressing banding.

According to an aspect of the invention, there is provided a printing control device for a printing unit that forms a print image corresponding to print data by performing main scanning to move a nozzle line, in which a plurality of nozzles are arranged in a different direction from a main scanning direction, relative to a print substrate in the main scanning direction and by performing sub-scanning to move the print substrate relative to the nozzle line in a sub-scanning direction. Main scanning performed two times by interposing sub-scanning of a distance d longer than a pitch of nozzles of the nozzle line in the sub-scanning direction is referred to as first main scanning and second main scanning, a region in which a print image is formed at a time of the first main scanning is referred to as a first print region, and a region in which the print image is formed at a time of the second main scanning is referred to as a second print region. The printing control device includes: a record density acquisition unit that acquires record density of the print image in a determination region including at least a part of the first print region based on the print data; and a sub-scanning control unit that changes an overlap between the first and second print regions in the sub-scanning direction by changing the distance d of the sub-scanning according to the acquired record density.

According to another aspect of the invention, there is provided a printing control method performed by the printing unit.

According to the above-described aspects, it is possible to provide a technology capable of improving a printing speed while suppressing banding.

The aspects of the invention can be applied to a printing apparatus including the printing control device, a printing method including the printing control method, a printing control program causing a computer to realize functions corresponding to the above-described constituent elements, a printing program including the printing control program, and a computer-readable medium recording such programs. The above-described device may be configured of a plurality of distributed portions.

BRIEF DESCRIPTION OF THE DRAWINGS

The invention will be described with reference to the accompanying drawings, wherein like numbers reference like elements.

FIG. 1 is a diagram schematically illustrating an example in which an overlap of a print region is changed by changing a distance of sub-scanning according to a record density.

FIG. 2 is a diagram schematically illustrating an example of the configuration of a serial printer which is a printing apparatus.

FIG. 3 is a diagram schematically illustrating an operation example of overlap printing.

FIGS. 4A and 4B are diagrams schematically illustrating an example in which a transport error occurs between print regions.

FIG. 4C is a diagram schematically illustrating an image of a print image in which print regions are overlapped by 3 nozzle pitches.

FIG. 4D is a diagram schematically illustrating an example in which stripes occur in edge portions of the overlap regions.

FIG. 4E is a diagram schematically illustrating an example of a print image in which the overlap regions are extended.

FIG. 5 is a flowchart illustrating an example of a printing control process.

FIG. 13 is a diagram schematically illustrating an operation example of pseudo-band printing.

DESCRIPTION OF EXEMPLARY EMBODIMENTS

Hereinafter, an embodiment of the invention will be described. Of course, the following embodiment is merely an example of the invention and all of the characteristics described in the embodiment may not be said to be requisites for solutions of the invention.

(1) Overview of Technology

An overview of the present technology will be described with reference to FIGS. 1 to 15B. FIGS. 1 to 15B are schematically illustrated diagrams and some of the diagrams are not conformed.

Aspect 1

Figure 8:
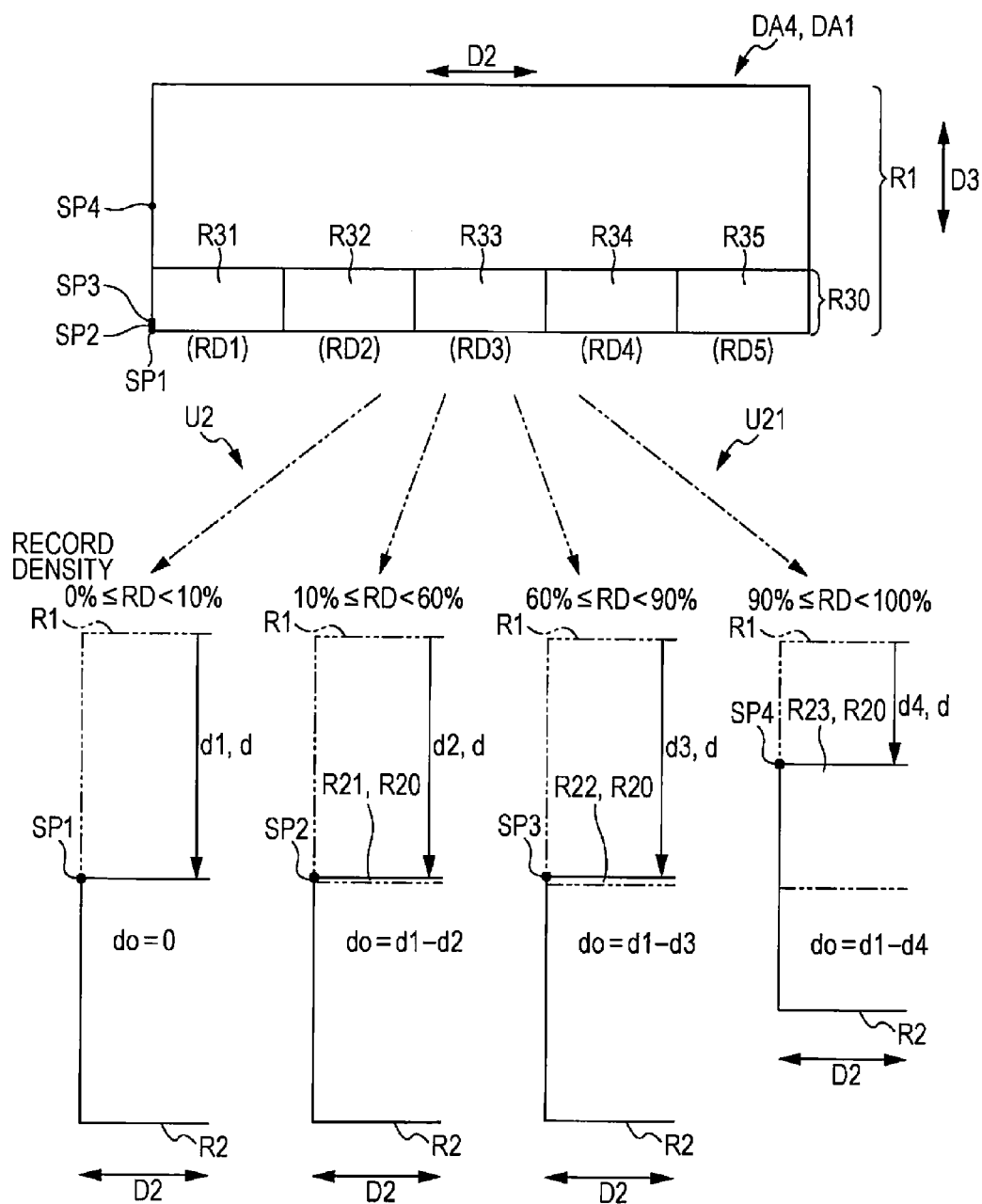
FIG. 8 is a diagram schematically illustrating an example in which the distance of the sub-scanning is changed according to a record density.

A printing apparatus (printing unit) 1 exemplified in FIGS. 1 to 3 performs main scanning and sub-scanning to form a print image IM1 corresponding to print data DA1. In main scanning, a nozzle line 68 in which a plurality of nozzles 64 are arranged in a different direction (for example, an arrangement direction D1) from a main scanning direction D2 is moved relative to a print substrate ME1 in the main scanning direction D2. In sub-scanning, the print substrate ME1 is moved relative to the nozzle line 68 in a sub-scanning direction D3. Here, main scanning performed two times by interposing sub-scanning of a distance d longer than a pitch Np of nozzles 64 of the nozzle line 68 in the sub-scanning direction D3 is referred to as first main scanning and second main scanning, a region in which a print image IM1 is formed at the time of the first main scanning is referred to as a first print region R1, and a region in which the print image IM1 is formed at the time of the second main scanning is referred to as a second print region R2. For example, in a case in which sub-scanning interposed between passes P1 and P2 is sub-scanning of a distance dl longer than the pitch Np of the nozzles, the pass P1 can be referred to as the first main scanning and the pass P2 can be referred to as the second main scanning. A print region R0 in which the print image IM1 is formed at the time of the pass P1 is referred to as the first print region R1 and the print region R0 in which the print image IM1 is formed at the time of the pass P2 can be referred to as the second print region R2. As illustrated in FIG. 8 and the like, a record density acquisition unit U1 included in a printing control device U0 acquires record density RD of the print image IM1 in a determination region R30 including at least a part of the first print region R1 based on the print data DA1. A sub-scanning control unit U2 included in the printing control device U0 changes an overlap between the first print region R1 and the second print region R2 in the sub-scanning direction D3 by changing the distance d of the sub-scanning according to the acquired record density RD.

A printing control method performed by the printing unit includes a record density acquisition step corresponding to the record density acquisition unit U1 and a sub-scanning control step corresponding to the sub-scanning control unit U2.

FIG. 1 is a diagram schematically illustrating an example in which an overlap of the print region R0 is changed by changing the distance d of the sub-scanning according to the record density RD. In the example of FIG. 1, in case of RD<10% (where the record density RD is less than 10%), the distance d of the sub-scanning is set to a length d1 of the nozzle line 68 in the sub-scanning direction D3 so that the previous and subsequent print regions R0 are not overlapped. In a case of 10%≤RD<60%, the distance d of the sub-scanning is set to d2 slightly shorter than d1 so that the previous and subsequent print regions R0 are partially overlapped. In a case of 60%≤RD<90%, the distance d of the sub-scanning is set to d3 slightly shorter than d2 and an overlap region R20 (also referred to as an overlap region) increases. In a case of 90%≤RD<100%, the distance d of the sub-scanning is set to d4 shorter than d3 and the overlap region R20 further increases.

As exemplified above, since the distance d of the sub-scanning is changed according to the record density RD of the print image IM1 in the determination region R30 including at least a part of the first print region R1 and an overlap between the print regions R1 and R2 in the sub-scanning direction D3 is changed, the overlap of the print regions R1 and R2 can be changed so that banding is suppressed and a printing speed is improved. Accordingly, according to the present aspect, it is possible to provide a technology capable of improving the printing speed while suppressing the banding.

Here, a nozzle is a small hole projecting an ink droplet. The ink droplet includes an uncolored ink such as an ink droplet for improving image quality.

A print substrate is a material that maintains a print image. The shape of a print substrate is generally rectangular, but includes a circle (for example, an optical disc such as a CD-ROM or a DVD), a triangle, a square, or a polygon and all of products and processed products of sheets and sheet boards disclosed in at least JIS (Japanese Industrial Standards) P0001: 1998 (terms of sheets, sheet boards, and pulps). For example, resin sheets, metal plates, and three-dimensional objects are included in print substrates.

The relative movement of the nozzle line and the print substrate includes movement of the nozzle line without movement of the print substrate, movement of the print substrate without movement of the nozzle line, and movement of both the nozzle line and the print substrate. As a representative example of a printing apparatus that moves a nozzle line without movement of a print substrate in a case in which dots are formed by ejecting ink droplets, a serial printer can be exemplified.

A record density means a ratio of the number of dots formed with respect to a predetermined number of pixels and means a ratio of dots when the dots are converted into largest dots (for example, large dots) in a case in which dots with different sizes are formed. For example, in a case in which Nd large dots are formed with respect to 100 pixels, the record density RD is Nd %.

The change in the overlap between the first and second print regions in the sub-scanning direction also includes a change in an overlap without overlapping of the first and second print regions.

Aspect 2

Figure 7:
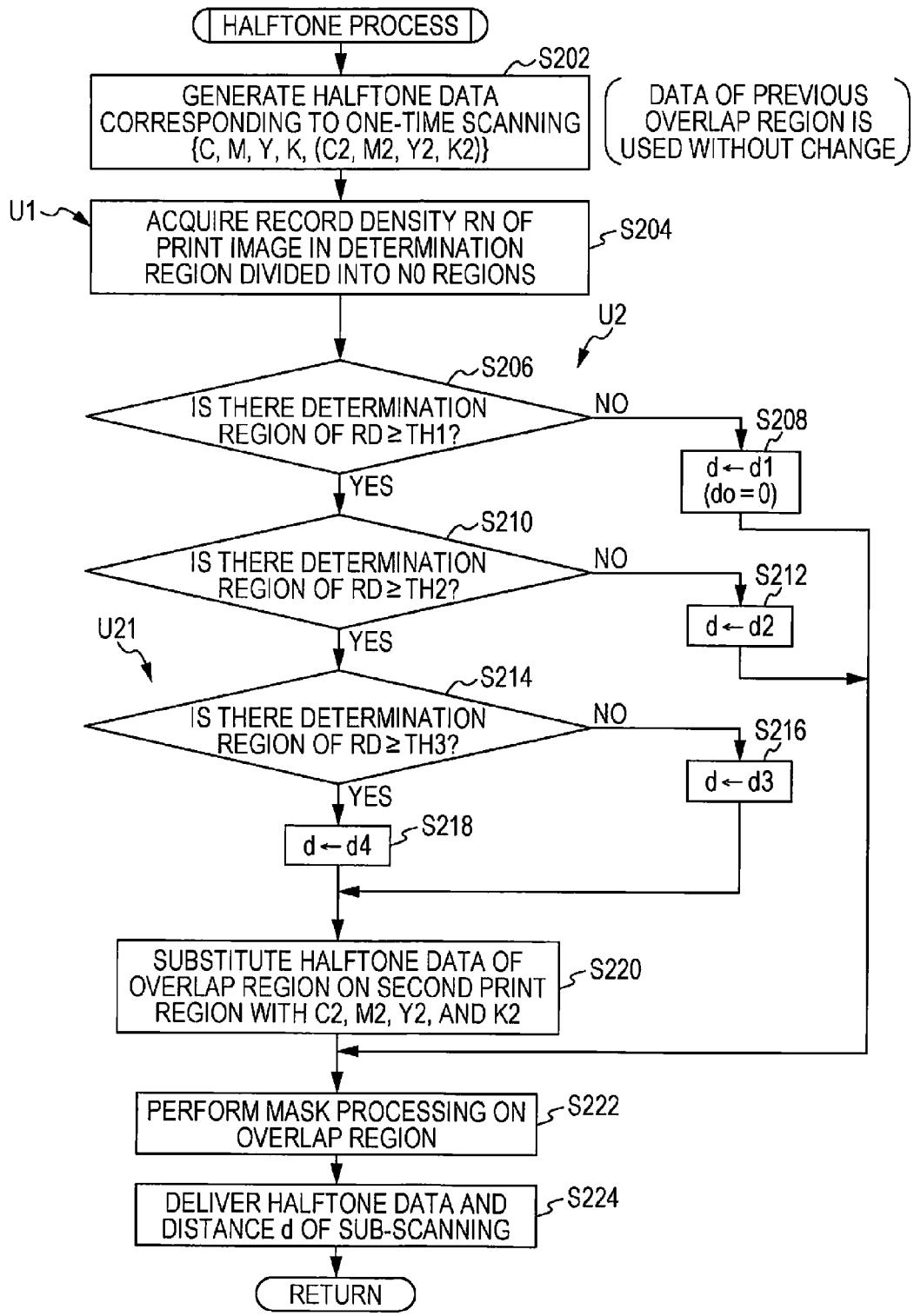
FIG. 7 is a flowchart illustrating an example of a halftone process.
Figure 11:
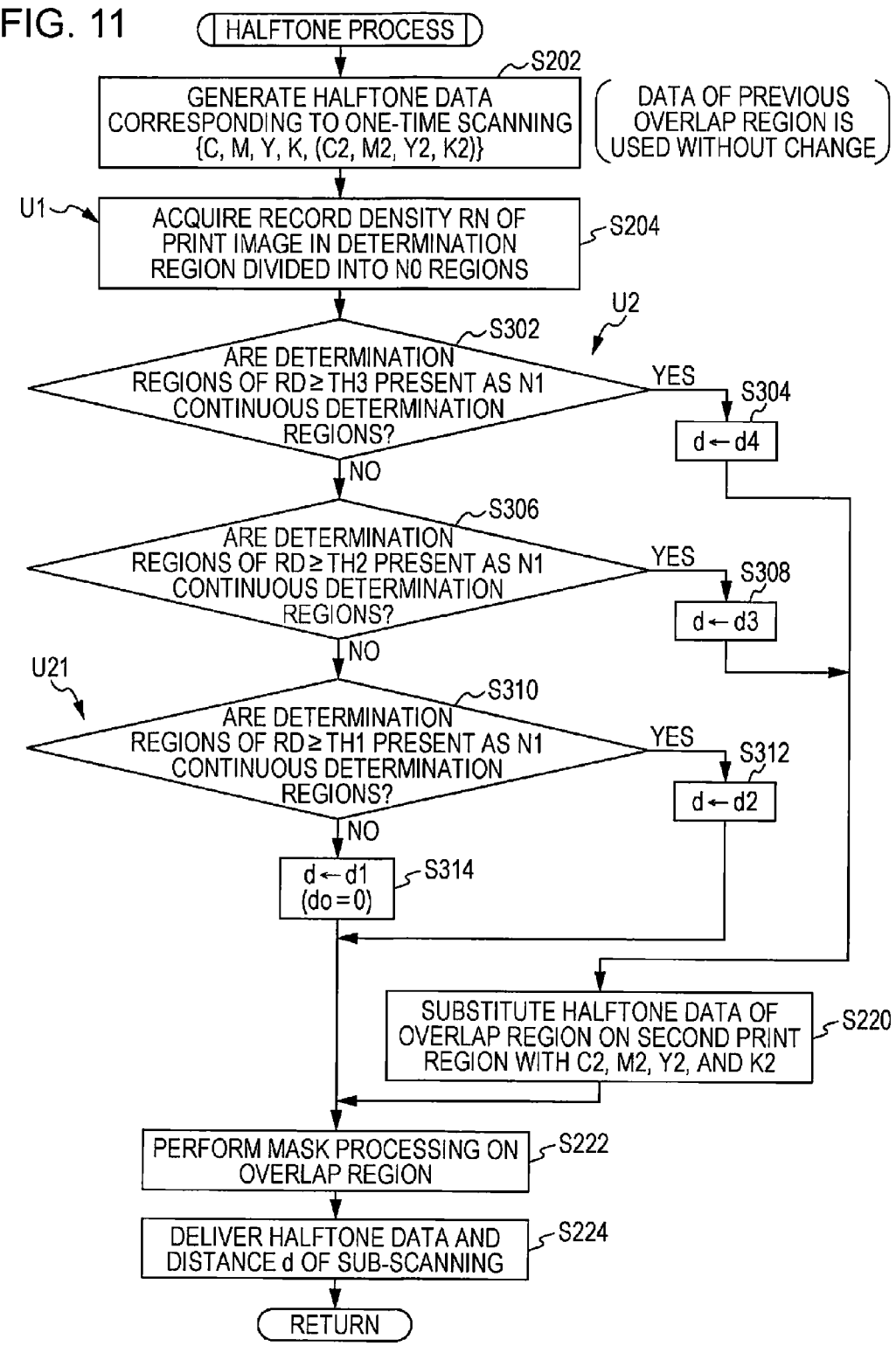
FIG. 11 is a flowchart schematically illustrating another example of the halftone process.

Incidentally, as illustrated in FIGS. 7, 8, 11, and the like, the sub-scanning control unit U2 may determine whether the record density RD acquired by the record density acquisition unit U1 is a higher-density side from a first determination standard (for example, determination density TH1). In a case in which the sub-scanning control unit U2 determines that the record density RD is the higher-density side, the sub-scanning control unit U2 may control the distance d of the sub-scanning such that the first print region R1 and the second print region R2 are partially overlapped in the sub-scanning direction D3. In a case in which the sub-scanning control unit U2 determines that the record density RD is not the higher-density side, the sub-scanning control unit U2 may control the distance d of the sub-scanning such that the first print region R1 and the second print region R2 are not overlapped in the sub-scanning direction D3. When the record density RD of the print image IM1 is high, the banding is easily conspicuous. According to the present aspect, in the case in which the record density RD of the print image IM1 in the determination region R30 is the higher-density side from the first determination standard, both of the print regions R1 and R2 are partially overlapped, and thus the banding is efficiently suppressed. In the case in which the record density RD of the print image IM1 in the determination region R30 is not the higher-density side from the first determination standard, the sub-scanning is performed so that both of the print regions R1 and R2 are not overlapped, and thus the printing speed is improved. Accordingly, according to the present aspect, it is possible to provide a technology considerably suitable to improve the printing speed while suppressing the banding.

Here, the fact that the record density RD is the higher-density side from the determination standard means that the record density RD is not a lower-density side from the determination standard. The fact that the record density RD is not the higher-density side from the determination standard means that the record density RD is the lower-density side from the determination standard. Accordingly, the sub-scanning control unit U2 according to the foregoing aspect 2 determines whether the record density RD acquired by the record density acquisition unit U1 is the lower-density side from the first determination standard. The sub-scanning control unit U2 controls the distance d of the sub-scanning such that the first print region R1 and the second print region R2 are not overlapped in the sub-scanning direction D3 in the case in which the record density RD is the lower-density side. The sub-scanning control unit U2 controls the distance d of the sub-scanning such that the first print region R1 and the second print region R2 are partially overlapped in the sub-scanning direction D3 in the case in which the record density RD is not the lower-density side.

Aspect 3

Based on the print data DA1, the record density acquisition unit U1 may acquire the record density RD of the print image IM1 in the determination region R30 in which a region on the side of the second print region R2 in the main scanning direction D2 in the first print region R1 is divided into N0 determination regions (where N0 is an integer equal to or greater than 2) in the main scanning direction D2. The sub-scanning control unit U2 determines whether the determination regions R30 in which the record density RD of the print image IM1 is equal to or greater than first determination density (for example, the determination density TH1) are present as N1 continuous determination regions or more (where N1 is an integer equal to or greater than 1 and less than N0) in the main scanning direction D2 among the N0 determination regions R30, controls the distance d of the sub-scanning such that the first print region R1 and the second print region R2 are partially overlapped in the sub-scanning direction D3 in a case in which the N1 continuous determination regions R30 or more are present, and controls the distance d of the sub-scanning such that the first print region R1 and the second print region R2 are not overlapped in the sub-scanning direction D3 in a case in which the N1 continuous determination regions R30 or more are not present. In the case in which it is determined that the determination regions R30 in which the record density RD is equal to or greater from first determination density are present as the N1 continuous determination regions or more in the main scanning direction D2, the record density RD is the higher-density side from the first determination standard and both of the print regions R1 and R2 are partially overlapped, and the banding is efficiently suppressed. In the case in which it is determined that the determination regions R30 in which the record density RD is equal to or greater than first determination density are not present as the N1 continuous determination regions or more in the main scanning direction D2, the record density RD is the lower-density side from the first determination standard and the sub-scanning is performed so that both of the print regions R1 and R2 are not overlapped, and thus the printing speed is improved. Accordingly, it is possible to provide the technology considerably suitable to improve the printing speed while suppressing the banding.

Here, as illustrated in FIG. 7, in a case of N1=1, the sub-scanning control unit U2 determines whether the determination region R30 in which the record density RD of the print image IM1 is equal to or greater than the first determination density is present among the N0 determination regions R30.

When TH1' is assumed to be determination density considerably less than the first determination density, the fact that "the record density RD is greater than the determination density TH1'" includes the fact that "the record density RD is equal to or greater than the first determination density".

Aspect 4

The sub-scanning control unit U2 may include a partial overlap sub-scanning control unit U21 that controls the distance d of the sub-scanning such that the first print region R1 and the second print region R2 are partially overlapped in the sub-scanning direction D3. Here, do is assumed to be a distance in which the first print region R1 and the second print region R2 are overlapped in the sub-scanning direction D3. The partial overlap sub-scanning control unit U21 may determine whether the record density RD acquired by the record density acquisition unit U1 is a higher-density side from a second determination standard (for example, determination density TH2) and controls the distance d of the sub-scanning such that the distance do in a case in which the record density RD is determined to be the higher-density side is longer than the distance do in a case in which the record density RD is determined not to be the higher-density side. According to the present aspect, the distance do in which both of the print regions R1 and R2 are overlapped in the case in which the record density RD of the print image IM1 in the determination region R30 is the higher-density side from the second determination standard is longer than the distance do in which both of the print regions R1 and R2 are overlapped in the case in which the record density RD is not the higher-density side. Accordingly, it is possible to provide the technology considerably suitable to improve the printing speed while suppressing the banding.

According to the foregoing aspect 4, the partial overlap sub-scanning control unit U21 determines whether the record density RD acquired by the record density acquisition unit U1 is the lower-density side from the second determination standard and controls the distance d of the sub-scanning such that the distance do in the case in which the record density RD is determined not to be the lower-density side is longer than the distance do in the case in which the record density is determined to be the lower-density side.

Aspect 5

Based on the print data DA1, the record density acquisition unit U1 may acquire the record density RD of the print image IM1 in the determination region R30 in which a region on the side of the second print region R2 in the main scanning direction D2 in the first print region R1 is divided into N0 determination regions in the main scanning direction D2. The partial overlap sub-scanning control unit U21 determines whether the determination regions R30 in which the record density RD of the print image IM1 is equal to or greater than second determination density (for example, determination density TH2) are present as N2 continuous determination regions or more in the main scanning direction D2 among the N0 determination regions R30 and controls the distance d of the sub-scanning such that the distance do in a case in which the N2 determination regions (where N2 is an integer equal to or greater than 1 and less than N0) or more are present is longer than the distance do in a case in which the N2 determination regions or more are not present. In the case in which the determination regions R30 in which the record density RD is equal to or greater than second determination density are present as N2 continuous determination regions or more in the main scanning direction D2, the record density RD is the higher-density side from the second determination standard, the distance do in which both of the print regions R1 and R2 are overlapped is longer than the distance do in which both of the print regions R1 and R2 are overlapped in the case in which the record density RD is not the higher-density side. Accordingly, it is possible to provide the technology considerably suitable to improve the printing speed while suppressing the banding.

Here, in a case of N2 =1, the partial overlap sub-scanning control unit U21 determines whether the determination region R30 in which the record density RD of the print image IM1 is equal to or greater than the second determination density among the N0 determination regions R30.

When TH2' is assumed to be determination density considerably less than the second determination density, the fact that "the record density RD is greater than the determination density TH2'" includes the fact that "the record density RD is equal to or greater than the second determination density".

Aspect 6

The sub-scanning control unit U2 may determine whether the record density RD acquired by the record density acquisition unit U1 is a higher-density side from the first determination standard (for example, the determination density TH1) on a lower-density side from the second determination standard (for example, the determination density TH2). The partial overlap sub-scanning control unit U21 may control the distance d of the sub-scanning in a case in which the sub-scanning control unit U2 determines that the record density RD is the higher-density side. The partial overlap sub-scanning control unit U21 may control the distance d of the sub-scanning such that the first print region RI and the second print region R2 are not overlapped in the sub-scanning direction D3 in a case in which the sub-scanning control unit U2 determines that the record density is not the higher-density side. According to the present aspect, in the case in which the record density RD of the print image IM1 in the determination region R30 is the lower-density side from the first determination standard, the sub-scanning is performed so that both of the print regions R1 and R2 are not overlapped, and thus the printing speed is improved. In the case in which the record density RD is the higher-density side from the first determination standard, the distance do in which both of the print regions R1 and R2 are overlapped when the record density RD is the higher-density side from the first determination standard is longer than the distance do in which both of the print regions R1 and R2 are overlapped when the record density RD is not the higher-density side. Accordingly, it is possible to provide the technology considerably suitable to improve the printing speed while suppressing the banding.

Aspect 7

Figure 6:
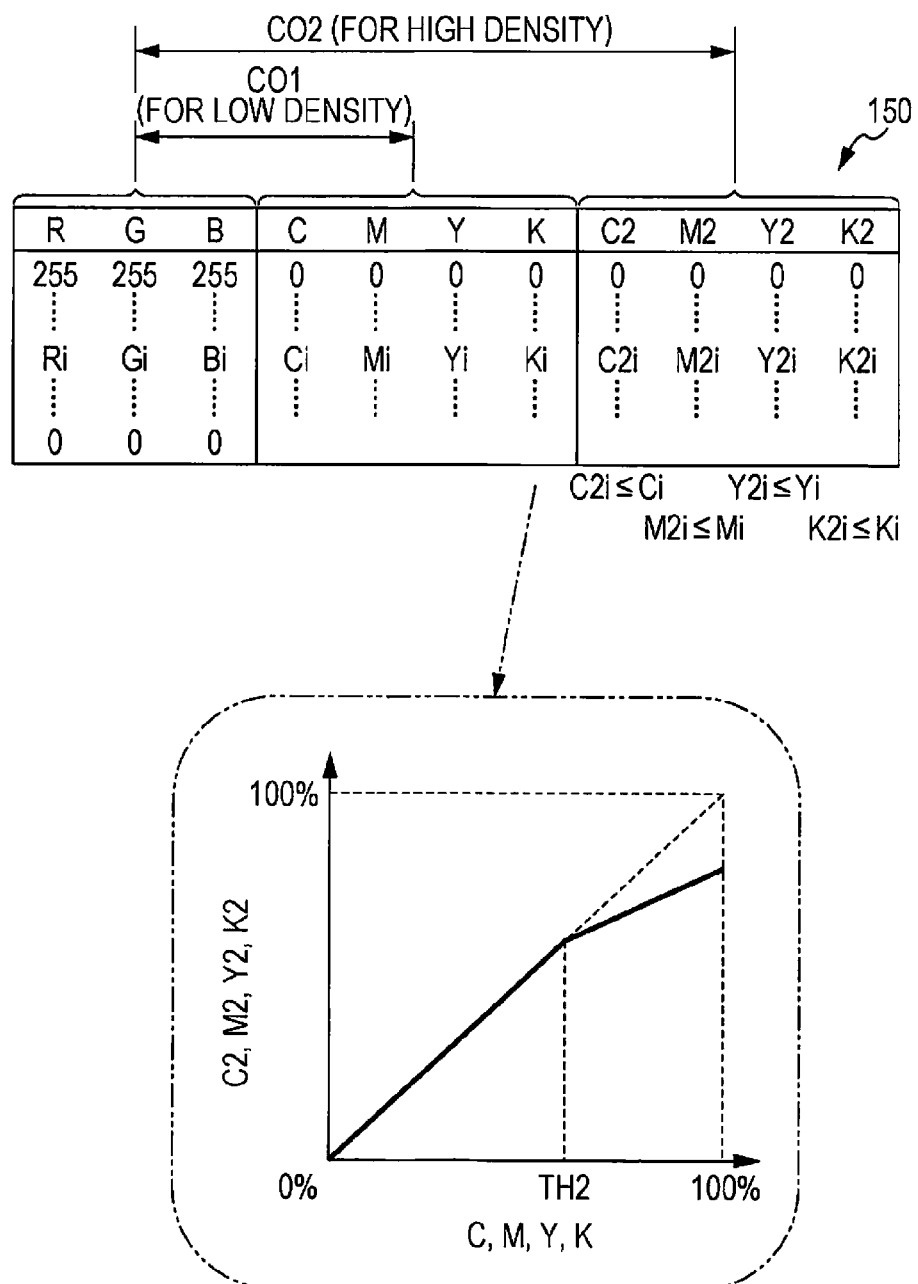
FIG. 6 is a diagram schematically illustrating an example of the structure of a color conversion table.

As illustrated in FIGS. 5 to 7 and the like, the printing control device U0 may include a color conversion unit U3 that performs color conversion on the print data (for example, the RGB data DA2) according to at least a first correspondence relation CO1 and may include a region printing control unit U4 that causes the printing unit (1) to form the print image IM1 of a region (for example, the print region R0) corresponding to each main scanning based on the print data (for example, CMYK data DA3) subjected to the color conversion. The region printing control unit U4 may perform control such that the print image IM1 is formed based on the print data (DA3) subjected to the color conversion by the color conversion unit U3 according to the first correspondence relation CO1 in a case in which the record density RD acquired by the record density acquisition unit U1 is not the higher-density side from the second determination standard (for example, the determination density TH2) in a region (R20) in which the first print region R1 and the second print region R2 are overlapped in the sub-scanning direction D3, and may perform control such that the print image IM1 is formed based on the print data (DA3) subjected to the color conversion by the color conversion unit U3 according to a second correspondence relation CO2 different from the first correspondence relation CO1 in a case in which the record density RD acquired by the record density acquisition unit U1 is determined to be the higher-density side from the second determination standard.

A printing control method performed by the printing unit may include a color conversion step corresponding to the color conversion unit U3 and a region printing control step corresponding to the region printing control unit U4.

In the case in which the print image IM1 has the high-density at the time of a test, it is known that banding occurs in the overlap region R20 when the print image IM1 is formed based on the print data (DA3) subjected to the color conversion according to the first correspondence relation CO1 irrespective of whether a region is the overlap region R20 of both the print regions R1 and R2. According to the present aspect, in the case in which the record density RD of the print image IM1 in the determination region R30 is the higher-density side from the second determination standard, the print image IM1 in the overlap region R20 is formed based on the print data (DA3) subjected to the color conversion according to the second correspondence relation CO2. Therefore, it is possible to provide the technology capable of further suppressing the banding.

Aspect 8

The record density RD of ink 66 expressed by the second correspondence relation CO2 may be considered to be equal to or less than the record density RD of the ink 66 expressed by the first correspondence relation CO1 in the case in which the same print data (for example, RGB data DA2) is subjected to the color conversion. In the case in which the print image IM1 has the high-density at the time of a test, it is known that the overlap region R20 is darkened when the print image IM1 is formed based on the print data (DA3) subjected to the color conversion according to the first correspondence relation CO1 irrespective of whether a region is the overlap region R20 of both the print regions R1 and R2. According to the present aspect, in the case in which the record density RD of the print image IM1 in the determination region R30 is the higher-density side from the second determination standard, the print image IM1 in the overlap region R20 is formed based on the print data (DA3) subjected to the color conversion according to the second correspondence relation CO2 expressing the record density RD of the ink 66 equal to less than the record density RD of the ink 66 expressed by the first correspondence relation CO1 . Therefore, it is possible to provide the considerably suitable technology capable of further suppressing the banding.

(2) Specific Example of Configuration of Printing Apparatus

FIG. 2 is a diagram schematically illustrating an example of the configuration of a serial printer which is a kind of ink jet printer as the printing apparatus (printing unit) 1 that realizes the operation example illustrated in FIG. 1. FIG. 3 is a diagram schematically illustrating an operation example of overlap printing. The printing apparatus 1 internally includes a printing unit in which a recording head (printing head) 61 and a print substrate ME1 are relatively moved and a printing control device U0 that controls the printing unit. The printing apparatus 1 repeats main scanning in which the recording head 61 and the print substrate ME1 are relatively moved in the main scanning direction D2 and performs sub-scanning in which the recording head 61 and the print substrate ME1 are relatively moved in the sub-scanning direction D3 between the main scanning. Hereinafter, the recording head is also simply referred to as a head. A relative movement distance d of one-time sub-scanning is longer than the pitch Np of the nozzles 64 of the nozzle line 68 in the sub-scanning direction D3. That is, the printing apparatus 1 forms all of the dots in an independent region R10 in the print region R0 through one-time main scanning and forms all of the dots in the overlap region R20 which is a link portion through two-time main scanning. Accordingly, the printing apparatus 1 can perform printing (which is assumed to be included in band printing) to form all of the dots in the independent region R10 through one-time main scanning and overlap printing to overlap a part of the print region R0 with the previous and subsequent print regions R0. In the printing apparatus 1 according to the specific example, the head 61 is moved in the main scanning direction D2 without moving the print substrate ME1 at the time of the main scanning and the print substrate ME1 is moved in the sub-scanning direction D3 at the time of the sub-scanning. Of course, the present technology can also be applied to a printing apparatus in which a print substrate is moved in a main scanning direction at the time of main scanning or a printing apparatus in which a head is moved in a sub-scanning direction at the time of sub-scanning.

The printing apparatus to which the present technology can be applied may be a copy machine, a facsimile, a multi-functional machine having such functions, or the like. Ink used in an ink jet printer that forms a color image includes, for example, cyan (C) ink, magenta (M) ink, yellow (Y) ink, and black (K) ink. Of course, the ink may include light cyan (Lc) ink, light magenta (Lm) ink, dark yellow (Dy) ink, light black (Lc) ink, orange (Or) ink, green (Gr) ink, and uncolored ink for an improvement in image quality.

To facilitate the description, the head 61 illustrated in FIG. 3 is assumed to have a nozzle line 68 in which 13 nozzles 64 are arranged at a predetermine pitch Np in an arrangement direction D1. The use of such a head 61 is included in the present technology. However, in practice, a head including a nozzle line that has many nozzles equal to or greater than, for example, 100 nozzles is used in many cases. Reference numeral RA denotes a raster in the main scanning direction D2, reference numeral PX denotes a pixel, reference numeral DT denotes a dot, and the nozzle 64 and the dot DT in passes P1, P2, P3, and P4 are indicated by circular numerals 1, 2, 3, and 4. The raster means a line of pixels continuing a line shape in the main scanning direction. In FIG. 3, the arrangement direction D1 and the sub-scanning direction D3 are the same, but the present technology also includes a case in which both of the directions D1 and D3 are different directions. The arrangement direction D1 and the main scanning direction D2 are orthogonal to (intersect) each other, the main scanning direction D2 and the sub-scanning direction D3 are orthogonal to (intersect) each other. However, the present technology also includes a case in which the directions may not orthogonal as long as the directions D1 and D3 are different from the main scanning direction D2.

The head 61 illustrated in FIG. 2 includes CMYK nozzles 64. FIG. 3 illustrates the nozzle line 68 including the plurality of nozzles 64 ejecting (discharging) ink droplets 67 of single color among CMYK. The present technology also includes a nozzle line in which nozzles are arranged in zigzags. In this case, the arrangement direction means a direction of arrangement of nozzles of each line in the zigzag-formed disposition. The nozzle pitch Np means a pitch of nozzles in the sub-scanning direction in all of the nozzle lines in the zigzag-formed disposition and is finer than the pitch of the nozzles of each line in the zigzag-formed disposition.

The printing apparatus 1 illustrated in FIG. 2 includes a controller 10, a random access memory (RAM) 20, a nonvolatile memory 30, a mechanism unit 50, interfaces (I/F) 71 and 72, and an operation panel 73. The controller 10, the RAM 20, the nonvolatile memory 30, the I/F 71, the I/F 72, and the operation panel 73 are connected to a bus 80 so that information can be mutually input and output.

The controller 10 includes a central processing unit (CPU) 11, a resolution conversion unit 41, a color conversion unit 42 (color conversion unit U3), a dot distribution unit 43, a halftone processing unit 44, and a signal transmission unit 45. The halftone processing unit 44 forms the record density acquisition unit U1 and the sub-scanning control unit U2. The dot distribution unit 43, the halftone processing unit 44, and the signal transmission unit 45 form the region printing control unit U4. The controller 10 can be configured of a system on a chip (SoC) or the like.

The CPU 11 is a device that mainly performs information processing or control in the printing apparatus 1.

The resolution conversion unit 41 converts the resolution of an input image from a host apparatus HT1, a memory card 90, or the like into a setting resolution (for example, 600× 600 dpi). The input image is expressed by, for example, RGB data that has integer values of 256 gray scales of RGB (read, green, and blue) in pixels. The RGB data DA2 subjected to the resolution conversion is print data before the color conversion and is included in the print data DA1 according to the present technology. The CMYK data DA3 and halftone data DA4 are also included in the print data DA1 according to the present technology.

FIG. 5 schematically illustrates examples of the structures of the RGB data DA2, the CMYK data DA3, and the halftone data DA4. The pixels PX of the pieces of data DA2, DA3, and DA4 are arranged methodically in the main scanning direction D2 and the sub-scanning direction D3. A gray scale value Ri of R, a gray scale value Gi of G, and a gray scale value Bi of B are stored in each pixel PX of the RGB data DA2. Here, i is a variable that identifies the pixel PX. The CMYK data DA3 is considered as, for example, gray scale data indicating a use amount of ink 66 of each pixel PX. A gray scale value Ci of C, a gray scale value Mi of M, a gray scale value Yi of Y, and a gray scale value Ki of K are stored in each pixel PX. The halftone data DA4 is considered as, for example, multivalue data indicating a formation statue of a dot of each pixel PX. A multivalue ci of C, a multivalue mi of M, a multivalue yi of Y, and a multivalue ki of K are stored in each pixel PX.

The color conversion unit 42 converts the RGB data DA2 with the setting resolution into the CMYK data DA3 having integer values of 256 gray scales of CMYK in the pixels PX with reference to, for example, an LUT (color conversion table) 150 that defines a correspondence relation between gray scale values of RGB and gray scale values of CMYK. The LUT is an abbreviation for a lookup table. The CMYK data DA3 is gray scale data that indicates a use amount of ink 66 of the pixels PX corresponding to the print image IM1. When a pixel i is focused on, pixel values (Ri, Gi, Bi) of the RGB data DA2 are converted into pixel values (Ci, Mi, Yi, Ki). As will be described in detail below, an LUT 150 illustrated in FIGS. 5 and 6 defines the first correspondence relation CO1 applied to a normal time and the second correspondence relation CO2 applied to an overlap region R20 in the case in which the record density RD is determined to be the higher-density side from the second determination standard.

The dot distribution unit 43 converts the CMYK data DA3 of 256 gray scales into dot data indicating occurrence amounts of a small dot, a middle dot, and a large dot with reference to, for example, a predetermined dot distribution table. The middle dot is a larger dot than the small dot and the large dot is a larger dot than the middle dot. The sizes of the dots may be equal to or less than two kinds of sizes or may be equal to or greater than 4 kinds of sizes. The dot data is considered as, for example, gray scale data that integer values of 256 gray scales indicating the occurrence amounts of dots in the pixels PX. In a case in which one kind of size of dot is used, the dot distribution unit is not necessary.

The halftone processing unit 44 performs, for example, a predetermined halftone process such as a dither method, an error diffusion method, or a density pattern method on the gray scale values of the pixels PX that form the dot data to reduce the number of gray scales of the gray scale values and generate the halftone data DA4. The halftone data DA4 is data that indicates a formation status of the dots DT of the pixels PX corresponding to the print image IM1. The halftone data DA4 may be multivalue data with 3 or more gray scales which can correspond to the dots with different sizes such as large, middle, and small dots or may be two-value data that indicates presence or absence of formation of dots. Four-value data which can correspond to, for example, large, middle, and small dots can be set as data in which 0 corresponds to no dot, 1 corresponds to formation of a small dot, 2 corresponds to formation of a middle dot, and 3 corresponds to formation of a large dot. When the halftone data DA4 is two-value data, for example, the two-value data can be set as data in which 0 corresponds to no dot and 1 corresponds to formation of a dot. When a pixel i is focused on, pixel values (Ci, Mi, Yi, Ki) of the CMYK data DA3 are converted into pixel values (ci, mi, yi, ki).

The halftone processing unit 44 may generate the halftone data DA4 of all regions of the print image IM1 and deliver the halftone data DA4 to the signal transmission unit 45, or may generate the halftone data DA4 in units of the print region R0 or units of the raster RA and deliver the halftone data DA4 to the signal transmission unit 45.

The signal transmission unit 45 generates a driving signal SG corresponding to a voltage signal to be applied to a driving element 63 of the head 61 from the halftone data DA4 and outputs the driving signal SG to a driving circuit 62. For example, when the halftone data DA4 indicates "formation of a small dot", a driving signal for ejecting an ink droplet for the small dot is output. When the halftone data DA4 indicates "formation of a middle dot", a driving signal for ejecting an ink droplet for the middle dot is output. When the halftone data DA4 indicates "formation of a large dot", a driving signal for ejecting an ink droplet for the large dot is output. The signal transmission unit 45 outputs a sub-scanning distance signal indicating the distance d of the sub-scanning to a sheet feeding mechanism 53. In a case in which the sheet feeding mechanism 53 corrects a predetermined feeding amount (for example, d1) to a correction amount (referred to as Δd) and feeds the print substrate ME1 in the sub-scanning direction D3, the signal transmission unit 45 may output the correction amount Δd corresponding to the distance d of the sub-scanning to the sheet feeding mechanism 53.

The units 41 to 45 may be configured of application specific integrated circuits (ASICs), data to be processed may be directly read from the RAM 20, or processed data may be directly written on the RAM 20.

The mechanism unit 50 controlled by the controller 10 includes a carriage motor 51, the sheet feeding mechanism 53, a carriage 60, and the head 61. The carriage motor 51 reciprocates the carriage 60 in the main scanning direction D2 via a plurality of gears and a belt 52 (none of which is illustrated). The sheet feeding mechanism 53 transports the print substrate ME1 in the sub-scanning direction D3. When a sub-scanning distance signal is input from the controller 10, the sheet feeding mechanism 53 transports the print substrate ME1 by the distance d indicated by the sub-scanning distance signal at the time of the sub-scanning. The head 61 that ejects the ink droplets 67 of, for example, CMYK is mounted on the carriage 60. The head 61 includes the driving circuit 62 and the driving element 63. The driving circuit 62 applies a voltage signal to the driving element 63 according to the driving signal SG input from the controller 10. As the driving element 63, for example, a piezoelectric element that applies pressure to the ink (liquid) 66 inside pressure chambers communicating with the nozzles 64 or a driving element that ejects the ink droplets 67 from the nozzles 64 by generating bubbles in pressure chambers by heat can be used. The ink 66 is supplied from ink cartridges (liquid cartridges) 65 to the pressure chambers of the head 61. A combination of the ink cartridges 65 and the head 61 is installed for each of, for example, CMYK. The ink 66 in the pressure chambers is ejected as the ink droplets 67 from the nozzles 64 to the print substrate ME1 by the driving element 63, and thus the dots DT of the ink droplets 67 are formed on the print substrate ME1 such as a print sheet. The head 61 is moved in the main scanning direction D2, that is, the plurality of nozzles 64 and the print substrate ME1 are relatively moved in the main scanning direction D2 to form dots according to the sizes of the dots indicated by the halftone data DA4 and form the print image IM1 on the print substrate ME1.

The RAM 20 stores, for example, the LUT 150 and a program PRG2 including a program that causes the printing apparatus 1 to function as the printing control device U0.

The nonvolatile memory 30 stores, for example, program data PRG1 (including the LUT 150) loaded on the RAM 20. A read-only memory (ROM), a flash memory, a magnetic recording medium such as a hard disk are used as the nonvolatile memory 30. The loading of the program data PRG1 means writing the program data PRG1 on the RAM 20 as the program PRG2 which can be interpreted by the CPU 11.

The card I/F 71 is a circuit that writes data on the memory card 90 or reads data from the memory card 90.

The communication I/F 72 is connected to the host apparatus HT1, and inputs and outputs information to and from the host apparatus HT1. The host apparatus HT1 includes a computer such as a personal computer, a digital camera, a digital video camera, and a mobile phone such as a smartphone.

The operation panel 73 includes an output unit 74 and an input unit 75 and a user can input various instructions to the printing apparatus 1. The output unit 74 is configured of, for example, a liquid crystal panel (display unit) that displays information according to various instructions or information indicating a state of the printing apparatus 1. The output unit 74 may output such information as audio. The input unit 75 is configured of, for example, an operation key (operation input unit) such as a cursor key or a decision key. The input unit 75 may be, for example, a touch panel that receives an operation on a display screen.

(3) Operation of Overlap Printing

First, an operation of a serial printer performing partial overlap printing will be described with reference to FIG. 3. As illustrated in FIG. 3, when L0 is the length of the nozzle line 68 in the sub-scanning direction D3 and d is a one-time feeding amount of the print substrate ME1 intermittently transported in the sub-scanning direction D3, d<L0 is satisfied in the overlap printing and (L0/2)<d<L0 is satisfied in partial overlap printing. In the example of FIG. 3, when the head 61 in the pass P1 at the time of stop of the transport of the print substrate ME1 is moved in the main scanning direction D2 and forms the dots DT using the ink droplets 67, the print substrate ME1 is transported by the distance d and the head 61 at the subsequent pass P2 at the time of stop of the transport of the print substrate ME1 is moved in the main scanning direction D2 to form the dots DT by the ink droplets 67. Here, one-time scanning is referred to as "pass". In bi-directional (Bi-d) printing, movement directions of the head 61 at the time of the ejection of the ink droplets are mutually different in the passes P1 and P2. In uni-directional (Uni-d) printing, movement directions of the head 61 at the time of the ejection of the ink droplets are the same in the passes P1 and P2. The same operation is performed in a subsequent pass P3 and the like.

Through the above-described operation, in the nozzles 64 between the adjacent passes, there are an overlap portion 220 in which positions are overlapped in the sub-scanning direction D3 and an independent portion 210 in which positions are not overlapped in the sub-scanning direction D3. Here, the nozzles 64 in the overlap portion 220 are referred to as overlap nozzles. In the print image IM1, the overlap region R20 in which the dots DT are formed in two-time scanning and the independent region R10 in which the dots DT is formed in one-time scanning occur. For example, in the independent region R10 of the pass P1, a dot is formed by the nozzle of circle 1. In the overlap region R20 which is a link portion of the passes P1 and P2, dots are formed by overlap nozzles of circle 1 and circle 2.

When L2 is the length of each of the overlap portion 220 and the overlap region R20 in the sub-scanning direction D3 and L1 is the length of each of the independent portion 210 and the independent region R10 in the sub-scanning direction D3, L1+L2=d is satisfied. In full-overlap printing, L1=0 is satisfied. In band printing which is not the overlap printing, L2=0 is satisfied.

(4) Relation between Record Density and Banding

FIG. 4A schematically illustrates an example in which an error occurs in a direction in which the print regions R0 are slightly distant from each other in transport of the print substrate ME1 in a case in which the print regions R0 are not overlapped in each main scanning. A print region in which dots are formed earlier is indicated by a solid line and a print region in which dots are formed later is indicated by a dotted line. The same applies to FIG. 4B. When a boundary between the print regions R0 has high density, a thin stripe (for example, a white stripe when a print substrate is white) occurs in the main scanning direction D2 in the boundary.

FIG. 4B schematically illustrates an example in which an error occurs in a direction in which the print regions R0 are slightly close to each other in transport of the print substrate ME1 in the case in which the print regions R0 are not overlapped in each main scanning. When a boundary between the print regions R0 has high density, a dark stripe (for example, a black stripe in a case of black ink) occurs in the main scanning direction D2 in the boundary.

Accordingly, in a case in which the record density RD of the print regions R0 near the boundary is the higher-density side from the first determination standard (for example, determination density TH1=10%), the print regions R0 are partially overlapped to suppress the thin stripe or the dark stripe, as illustrated in FIG. 4C. A dot DTI indicated by a solid line is a dot formed in first main scanning in the overlap region R20 and a dot DT2 indicated by a dotted line is a dot formed in second main scanning in the overlap region R20. The same applies to FIGS. 4D and 4E.

Here, when the boundary between the print regions R0 has low density, the thin stripe in the case illustrated in FIG. 4A or the dark stripe in the case illustrated in FIG. 4B does not occur or is not conspicuous. Accordingly, in a case in which the record density RD of the print regions R0 near the boundary is the lower-density side from the first determination standard, the print regions R0 are not overlapped to improve a printing speed.

FIG. 4C schematically illustrates an example of the print image IM1 in which the print regions R0 are overlapped by 3 nozzle pitches when the number of overlap nozzles is 3. In a case in which the record density RD of the print regions R0 near the boundary is the higher-density side from the first determination standard and is the lower-density side from the second determination standard (for example, determination density TH2=60%), a thin stripe or a dark stripe is suppressed even when an error occurs in transport of the print substrate ME1. As illustrated in FIG. 4D, however, in a case in which the record density RD of the print regions R0 near the boundary is the higher-density side from the second determination standard, dark stripes BA1 occur in edge portions of the overlap region R20 in the main scanning direction D2 in some cases. This is supposed because links of the dots are numerous in the edge portions of the overlap region R20. For example, the dark stripes BA1 are conspicuous in some cases because an overlap between the print regions R0 corresponds to 3 nozzle pitches in a case in which the nozzle pitch Np in the sub-scanning direction D3 corresponds to 600 dpi, and the upstream dark stripe BA1 is close to the dark stripe BA1. Even when a color conversion table for reducing a use amount of ink in order to suppress the conspicuousness of the dark stripes BA1 is applied to the overlap region R20, it is not sufficient to resolve the conspicuousness of the dark stripes BA1. Accordingly, as illustrated in FIG. 4E, the conspicuousness of the dark stripes BA1 is suppressed by spreading the overlap region R20 in the sub-scanning direction D3 and separating the edge portions of the overlap region R20.

FIG. 4E schematically illustrates an example of the print image IM1 in which the print regions R0 are overlapped by 6 nozzle pitches when the number of overlap nozzles is 6. As a result of the test, while the conspicuousness of the dark stripes BA1, as described above, is suppressed, the entire overlap region R20 is darkened in some cases. This is supposed because an ooze of an ink droplet in the overlap region R20 in which all of the dots are formed through two-time main scanning on the print substrate is smaller than in the independent region R10, and thus the ink easily stays on the surface of the print substrate. Accordingly, by applying a color conversion table for reducing a use amount of ink in the overlap region R20 further than in the independent region R10 in a case in which the record density RD of the print regions R0 near the boundary is the higher-density side from the second determination standard, the dark stripes in the entire overlap region R20 is suppressed.

(5) Specific Example of Printing Control Process

FIG. 5 illustrates an example of a printing control process that is performed by the controller 10. Here, step S104 corresponds to the color conversion unit U3, step S106 corresponds to the record density acquisition unit U1 and the sub-scanning control unit U2, and steps S106 to S108 correspond to the region printing control unit U4. Hereinafter, notation of "step" is omitted.

The resolution conversion unit 41 of the controller 10 converts the resolution of an input image into the setting resolution and generates the RGB data DA2 before the color conversion (S102). Thereafter, the color conversion unit 42 of the controller 10 performs color conversion to convert the RGB data DA2 into the CMYK data DA3 with reference to the LUT 150 (S104).

FIG. 6 schematically illustrates an example of the structure of the LUT 150. In the LUT 150, output coordinate values (Ci, Mi, Yi, Ki) indicating the use mounts of ink of the first correspondence relation CO1 and output coordinate values (C2i, M2i, Y2i, and K2i) indicating the use amounts of ink of the second correspondence relation CO2 match the same input coordinate values (Ri, Gi, Bi). The first correspondence relation CO1 is applied to the independent region R10 and the overlap region R20 in the case in which the record density RD is determined to be the lower-density side from the second determination standard. The second correspondence relation CO2 is applied to the overlap region R20 in the case in which the record density RD is determined to be the higher-density side from the second determination standard. The color conversion unit 42 generates CMYK data for an independent region and a low-density overlap region from the RGB data DA2 according to the first correspondence relation CO1 and also generates C2M2Y2K2 data for a high-density overlap region from the RGB data DA2 in its background according to the second correspondence relation CO2. Here, in a case in which the input coordinate values (Ri, Gi, Bi) corresponding to pixel values of the RGB data DA2 are defined in the LUT 150, pixel values of the CMYK data are set to output coordinate values (Ci, Mi, Yi, Ki) and pixel values of the C2M2Y2K2 data are set to output coordinate values (C2i, M2i, Y2i, and K2i). In a case in which no input coordinate values corresponding to the pixel values of the RGB data DA2 are defined in the LUT 150, output coordinate values corresponding to the input coordinate values close to the pixel values of the RGB data DA2 are interpolated and set to pixel values of the CMYK data and the C2M2Y2K2 data. The CMYK data DA3 include CMYK data according to the first correspondence relation CO1 and C2M2Y2K2 data concealed in this step. By performing a color conversion process according to the first correspondence relation CO1 and a color conversion process according to the second correspondence relation CO2 together, an increase in a processing time is suppressed.

The output coordinate values of the LUT 150 are defined such that $C2i \leq Ci$, $M2i \leq Mi$, $Y2i \leq Yi$, and $K2i \leq Ki$ are satisfied. That is, the record density RD of the ink 66 indicated by the second correspondence relation CO2 is set to be equal to or less than the record density RD of the ink 66 indicated by the first correspondence relation CO1 in a case in which the same RGB data DA2 is subjected to color conversion. In the lower part of FIG. 6, an example of a relation between the record density of the ink of the first correspondence relation CO1 and the record density of the ink of the second correspondence relation CO2 is illustrated. Here, the horizontal axis represents the record density of the ink of one of CMYK in the first correspondence relation CO1 and the vertical axis represents the record density of the ink of the same color in the second correspondence relation CO2. FIG. 6 illustrates an example in which $C2i=Ci$, $M2i=Mi$, $Y2i=Yi$, and $K2i=Ki$ are satisfied in a case of $RD \leq TH2$ and $C2i<Ci$, $M2i<Mi$, $Y2i<Yi$, and $K2i<Ki$ are satisfied in a case of $RD>TH2$. Of course, the relation between the first correspondence relation CO1 and the second correspondence relation CO2 is not limited to the example illustrated in FIG. 6.

Thereafter, in a case in which the CMYK data DA3 is divided into pieces of dot data of small, middle, and large dots, the dot distribution unit 43 of the controller 10 generates dot data from the CMYK data DA3 with reference to a dot distribution table. The dot data also includes dot data from the CMYK data according to the first correspondence relation CO1 and dot data concealed from the C2M2Y2K2 data according to the second correspondence relation CO2. The controller 10 performing the processes of S106 to S110 generates the halftone data DA4 in units of main scanning based on the dot data or the CMYK data DA3 and supplies the driving signal SG to the head 61.

FIG. 7 illustrates an example of a halftone process performed in S106. This process is performed by the halftone processing unit 44 of the controller 10. Here, S204 corresponds to the record density acquisition unit U1, S206 to S224 correspond to the sub-scanning control unit U2, and some of S214 to S224 correspond to the partial overlap sub-scanning control unit U21.

The halftone processing unit 44 first generates the halftone data DA4 corresponding to one-time scanning based on the dot data necessary for the halftone data DA4 corresponding to one-time scanning or the CMYK data DA3 (S202). In a case in which a print region (a print region R0a illustrated in FIG. 10) in which a print image is formed at the time of previous main scanning and a print region (the first print region R1) in which a print image is formed at the time of current main scanning are partially overlapped, the halftone data allocated to the previous print region is assumed to be used without change as the halftone data of the overlap region (an overlap region R20a illustrated in FIG. 10). The halftone data DA4 allocated to a print region other than the overlap region includes halftone data from the CMYK data according to the first correspondence relation CO1 and halftone data concealed from the C2M2Y2K2 data according to the second correspondence relation CO2. The halftone data used in the processes of S204 to S218 is the halftone data from the CMYK data according to the first correspondence relation CO1. The current main scanning is set to first main scanning according to the present technology, subsequent main scanning is set to second main scanning according to the present technology, a region in which the print image IM1 is formed at the time of the first main scanning is set to a first print region R1, and a region in which the print image IM1 is formed at the time of the second main scanning is set to a second print region R2.

In S204, as illustrated in FIG. 8, the record density RD of the print image IM1 in the determination region R30 in which a region on the side of the second print region R2 in the main scanning direction D2 in the first print region R1 is divided into N0 determination regions (where N0 is an integer equal to or greater than 2) in the main scanning direction D2 is acquired based on the halftone data DA4 (print data DA1) corresponding to one-time scanning. FIG. 8 schematically illustrates an example in which the distance d in the sub-scanning is changed according to the record density RD. The determination region R30 illustrated in FIG. 8 is a part of the first print region R1 and is schematically divided into determination regions R31 to R35 of N0=5. Of course, the division number N0 of determination regions may be 6 or more or may be 4 or less.

Record density RN of each of the determination regions R31 to R35 can be expressed as, for example, (Ndot/Npx)× 100% when Npx is the number of all the pixels of each of the determination regions R31 to R35 and Ndot is the total number of dots (large-dot conversion) formed in each of the determination regions R31 to R35. Here, a middle dot is converted into Cm (0<Cm<1) of a large dot and a small dot is converted into Cs (0<Cs<Cm) of a large dot. In S204, record densities RD1, RD2, RD3, RD4, and RD5 of the determination regions R31, R32, R33, R34, and R35 are acquired. After S206, a process is branched according to whether the record density RD is a higher-density side from the determination densities TH1 to TH3. Here, 0%<TH1<TH2<TH3<100% is satisfied.

Figure 9A:
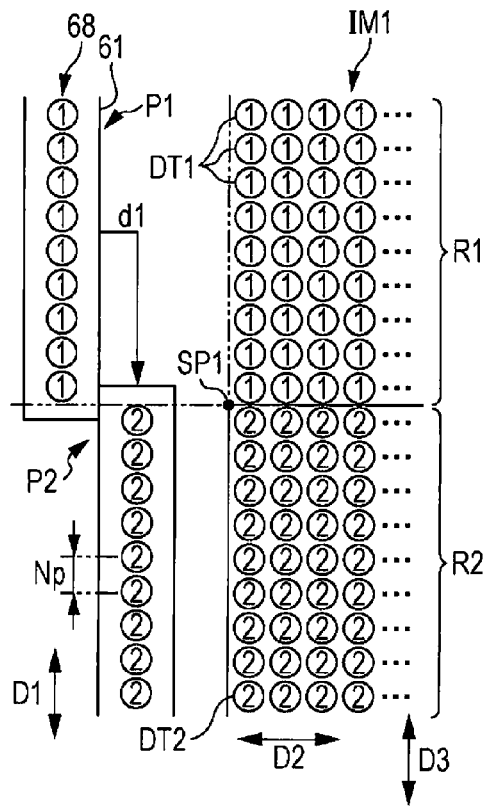
FIGS. 9A to 9C are diagrams schematically illustrating an example in which first and second print regions are overlapped when the distance of the sub-scanning is changed.
Figure 9B:
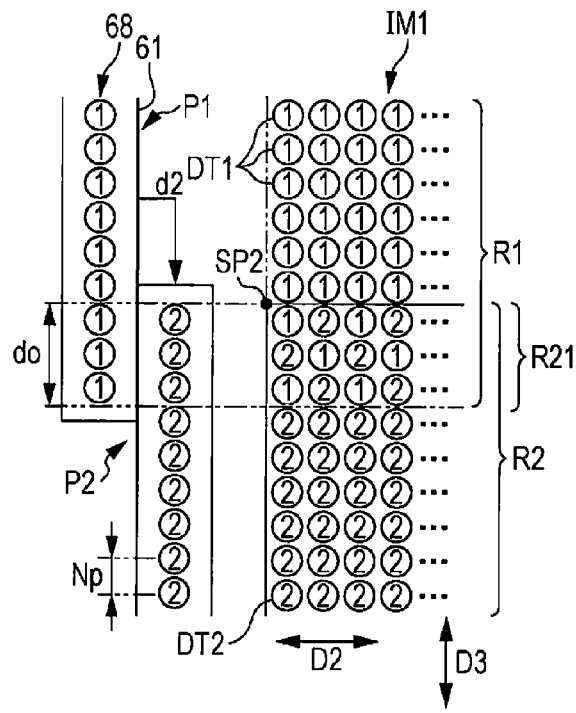
Figure 9C:
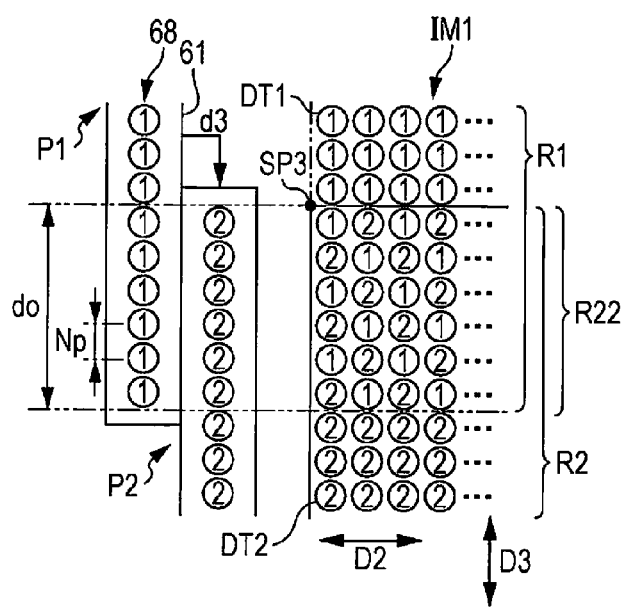

In S206, it is determined whether there is record density equal to or greater than the first determination density TH1 among the record densities RD1 to RD5. An example in which the first determination density TH1 is 10% is illustrated in FIG. 8, but the first determination density TH1 is not limited to 10%. The determination of S206 is determination regarding whether the acquired record density RD is the higher-density side from the first determination standard. In a case in which there is no determination region of RD≥TH1, that is, a case in which all of the determination regions R31 to R35 satisfy RD<TH1 and are on the lower-density side, the halftone processing unit 44 sets the distance d of the sub-scanning to d1 so that the distance do in which the first print region R1 and the second print region R2 are overlapped is 0 by design (S208), and then the process proceeds to S222. The distance d1 is a length L0 of the nozzle line 68 in the sub-scanning direction D3, as illustrated in FIG. 3. In a case in which all of the determination regions R31 to R35 are on the lower-density side from the first determination density TH1, as illustrated in FIGS. 4A and 4B, a risk of the banding is low even when a slight error occurs in the transport of the print substrate ME1. Accordingly, in order to improve the printing speed using the nozzles 64 of the nozzle line 68 maximally, the distance d of the sub-scanning is set to the length d1 of the nozzle line 68 in the sub-scanning direction D3. In this case, a start position SP1 of the second print region R2 becomes an end position of the first print region R1, as illustrated in FIGS. 8 and 9A. FIGS. 9A to 9C schematically illustrate an overlap of the print regions R1 and R2 when the distance d of the sub-scanning is changed on the assumption that the pass P1 is the first main scanning and the pass P2 is the second main scanning.

In S206, in a case in which at least one of the determination regions R31 to R35 satisfies RD≥TH1 and is on the higher-density side from the first determination density TH1, the halftone processing unit 44 allows the process to proceed to S210. In a case in which at least one of the determination regions R31 to R35 is on the higher-density side from the first determination density TH1, banding easily occurs (a risk of banding is high) when a slight error occurs in the transport of the print substrate ME1, as illustrated in FIGS. 4A and 4B. Accordingly, in order to suppress the banding, the distance d of the sub-scanning is set to any of distances d2 to d4 shorter than the length d1 of the nozzle line 68 in the sub-scanning direction D3 and the print regions R1 and R2 are partially overlapped in the sub-scanning direction D3.

In S210, it is determined whether there is record density equal to or greater than the second determination density TH2 among the record densities RD1 to RD5. An example in which the second determination density TH2 is set to 60% is illustrated in FIG. 8, but the second determination density TH2 is not limited to 60%. The determination of S210 is determination regarding whether the acquired record density RD is the higher-density side from the second determination standard. In a case in which there is no determination region of RD≥TH2, that is, all of the determination regions R31 to R35 satisfy RD<TH2 and are on the lower-density side from the second determination density TH2, the halftone processing unit 44 sets the distance d of the sub-scanning so that the first print region R1 and the second print region R2 are slightly overlapped to d2 (S212), and then the process proceeds to S222. In the example illustrated in FIG. 4C, the distance do in which the print regions R1 and R2 are overlapped is set to 3 nozzle pitches. Of course, the distance do=d1–d2 in which the print regions R1 and R2 are overlapped can be appropriately changed according to a print resolution or a nozzle pitch. In a case in which at least one of the determination regions R31 to R35 is on the higher-density side from the first determination density TH1 and all of the determination regions R31 to R35 are on the lower-density side from the second determination density TH2, as illustrated in FIGS. 4A and 4B, a stripe occurring in the boundary of the print regions R1 and R2 is easily conspicuous when a transport error of the print substrate ME1 occurs. In order to suppress the banding caused due to the transport error of the print substrate ME1 and improve the printing speed, the distance d of the sub-scanning is set to d2 longer than the distance (equal to or less than d3) of the sub-scanning in the case in which the record density RD is the higher-density side from the second determination standard and the distance do in which the print regions R1 and R2 are overlapped is set to be relatively shorter. In this case, as illustrated in FIGS. 8 and 9B, a start position SP2 of the second print region R2 is moved further inside the first print region R1 than the end position of the first print region R1. Accordingly, an overlap region R21 occurs in the print regions R1 and R2.

In S210, in a case in which at least one of the determination regions R31 to R35 satisfies RD≥TH2 and is on the higher-density side from the second determination density TH2, the halftone processing unit 44 allows the process to proceed to S214. In a case in which at least one of the determination regions R31 to R35 is the higher-density side from the second determination density TH2, the dark stripes BA1 occur on the upstream side and the downstream side of the edge portions of the overlap region R20 in the main scanning direction D2, as comparatively illustrated in FIGS. 4C and 4D. Since the dark stripe BA1 on the upstream side is close to the dark stripe BA1 on the downstream side, the dark stripes BA1 are conspicuous in some cases. Accordingly, in order to suppress the conspicuousness of the dark stripes BA1 by separating the dark stripe BA1 on the upstream side from the dark stripe BA1 on the downstream side, the distance d of the sub-scanning is set such that the distance do in which the print regions R1 and R2 are overlapped is longer than in the case in which there is no determination region of RD≥TH2.

In S214, it is determined whether there is record density equal to or greater than the third determination density TH3 among the record densities RD1 to RD5. An example in which the third determination density TH3 is se to 90% is illustrated in FIG. 8, but the third determination density TH3 is not limited to 90%. The determination of S214 is determination regarding whether the acquired record density RD is the higher-density side from the third determination standard. In a case in which there is no determination region of RD≥TH3, that is, a case in which all of the determination regions R31 to R35 satisfy RD<TH3 and are on the lower-density side from the third determination density TH3, the halftone processing unit 44 sets the distance d of the sub-scanning to d3 so that the distance do in which the print regions R1 and R2 are overlapped is shorter than in a case in which there is a determination region of RD≥TH3 and is longer than in a case in which all of the determination regions R31 to R35 satisfy RD<TH2 (S216), and then the process proceeds to S220. In the example illustrated in FIG. 4E, the distance do in which the print regions R1 and R2 are overlapped is set to 6 nozzle pitches. Of course, the distance do=d1–d3 in which the print regions R1 and R2 are overlapped can be appropriately changed according to a print resolution or a nozzle pitch. In a case in which all of the determination regions R31 to R35 are on the lower-density side from the third determination density TH3 and at least one of the determination regions R31 to R35 is on the higher-density side from the second determination density TH2, as illustrated in FIG. 4D, the dark stripes BA1 are easily conspicuous when the dark stripe BA1 on the upstream side is close to the dark stripe BA1 on the downstream side. Accordingly, in order to suppress the conspicuousness of the dark stripes BA1 by separating the edge portions of the overlap region R20, as illustrated in FIG. 4E, the distance d of the sub-scanning is set to d3 shorter than the distance (equal to or greater than d2) of the sub-scanning in which the record density RD is the lower-density side from the second determination standard and the distance do in which the print regions R1 and R2 are overlapped is set to be relatively long. In this case, a start position SP3 of the second print region R2 is moved further inside the first print region R1 than the start position SP2, as illustrated in FIGS. 8 and 9C. Accordingly, an overlap region R22 occurs in the print regions R1 and R2.

In S214, in a case in which at least one of the determination regions R31 to R35 satisfies RD≥TH3 and is on the higher-density side from the third determination density TH3, the halftone processing unit 44 sets the distance d of the sub-scanning to d4 so that the distance do in which the print regions R1 and R2 are overlapped is longer than in the case in which all of the determination regions R31 to R35 satisfy RD<TH3 (S218), and then the process proceeds to S220. In the example illustrated in FIG. 8, d4=d1/2 corresponding to a feeding amount of one-time full-overlap printing is set. In a case in which at least one of the determination regions R31 to R35 is on the higher-density side from the third determination density TH3, there is a possibility of the overlap region R20 being seen in a stripe shape even when the second correspondence relation CO2 different form the first correspondence relation CO1 applied to the independent region R10 is applied to the overlap region R20. To suppress the banding in a case in which at least one of the determination regions R31 to R35 has considerably high density, the distance do in which the print regions R1 and R2 are overlapped is set to d1/2 corresponding to full-overlap printing. In this case, a start position SP4 of the second print region R2 is an intermediate position of the first print region R1 in the sub-scanning direction D3, as illustrated in FIG. 8. Accordingly, an overlap region R23 occurs in the print regions R1 and R2.

In a case in which at least one of the determination regions R31 to R35 is on the higher-density side from the second determination density TH2, the halftone processing unit 44 substitutes halftone data of an overlap region (an overlap region R20b illustrated in FIG. 10) on the side of the second print region R2 with halftone data concealed from the C2M2Y2K2 data according to the second correspondence relation CO2 (S220). Accordingly, forming of the print image IM1 of the overlap region R20b is controlled based on the C2M2Y2K2 data subjected to the color conversion by the color conversion unit 42 according to the second correspondence relation CO2, and thus dark stripes of the entire overlap region 20b are suppressed. Conversely, in a case in which all of the determination regions R31 to R35 are on the lower-density side from the second determination density TH2, the process of S220 is not performed. Therefore, the halftone data of the overlap region R20b on the side of the second print region R2 is the halftone data from the CMYK data according to the first correspondence relation CO1. In this case, the forming of the print image IM1 of the overlap region R20b is controlled based on the CMYK data subjected to the color conversion by the color conversion unit 42 according to the first correspondence relation CO1.

Figure 10:
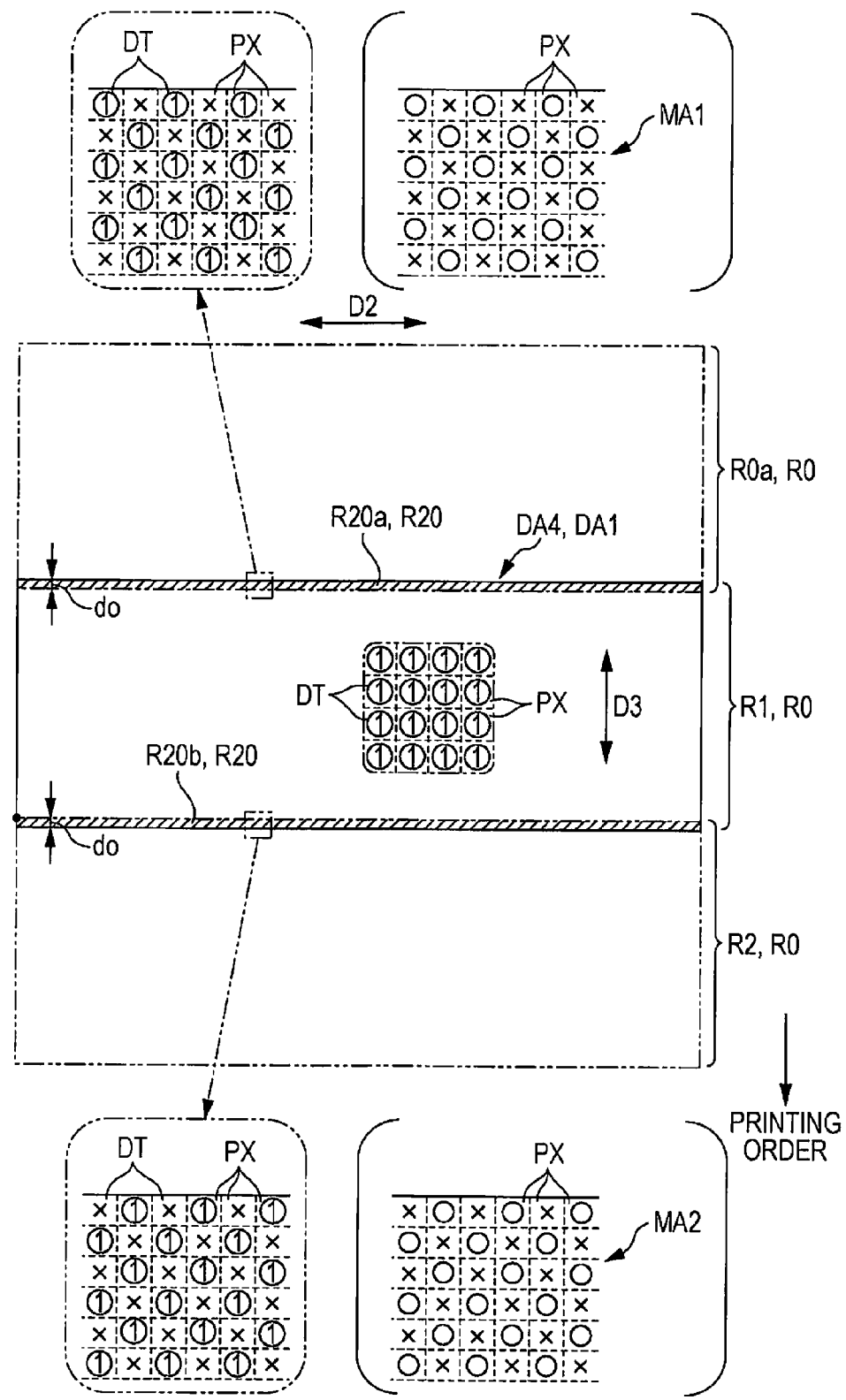
FIG. 10 is a diagram schematically illustrating an example of mask processing.

In S222, mask processing is performed on the overlap region R20 in the first print region R1. As illustrated in FIG. 10, the overlap region R20 included in the first print region R1 includes the overlap region R20a with a print region R0a in front of the first print region R1 and the overlap region R20b with the second print region R2. Of course, the overlap region R20a is not present in some cases depending on the record density of the determination region of the previous print region R0a and the overlap region R20b is not present in some cases depending on the record density of the current first print region R1. The mask processing can be performed as, for example, a process of thinning out dots by applying masks MA1 and MA2 illustrated in FIG. 10 to the halftone data DA4 of the overlap regions R20a and R20b. Here, "o" of the masks MA1 and MA2 means pixels for which the dots DT remain and "x" of the masks MA1 and MA2 means pixels for which the dots DT are not formed. A pixel of "o" in the mask MA1 is located at the position of a pixel of "x" in the mask MA2. A pixel of "x" in the mask MA1 is located at the position of a pixel of "o" in the mask MA2. When the mask MA1 is applied to the overlap region (R20a) with a previous print region in each print region R0 and the mask MA2 is applied to the overlap region (R20b) with a subsequent print region, dots are formed so that the dots are not overlapped in the pixels of the overlap region R20 by design. Of course, patterns of the masks MA1 and MA2 are not limited to the patterns illustrated in FIG. 10 and a ratio of the remaining pixels to the pixels for which the dots are not formed may be changed according to the position of a raster. In the expanded diagram of FIG. 10, the positions of the dots formed in current main scanning are illustrated in a case in which the dots DT are formed in all the pixels of the overlap regions R20a and R20b.

Thereafter, the halftone processing unit 44 delivers the halftone data DA4 subjected to the mask processing as necessary and the distance d of the sub-scanning to the signal transmission unit 45 (S224), and then ends the halftone process.

The signal transmission unit 45 receiving the halftone data DA4 and the distance d of the sub-scanning from the halftone processing unit 44 generates the driving signal SG from the halftone data DA4, outputs the driving signal SG to the driving circuit 62 in S108 of FIG. 5, generates a sub-scanning distance signal indicating the distance d of the sub-scanning, and outputs the sub-scanning distance signal to the sheet feeding mechanism 53. Accordingly, the multivalue or two-value dots DT according to the halftone data DA4 are formed as the print image IM1 corresponding to one-time scanning in the first print region R1 and the print substrate MEI is transmitted by the distance d in the sub-scanning direction D3.

Here, in the case of d=d1, as illustrated in FIGS. 8 and 9A, the print regions R1 and R2 are not overlapped. In this case, in the sub-scanning direction D3, all of the dots DT1 in the first print region R1 up to the start position Sp1 are formed in the pas P1 and all of the dots DT2 in the second print region R2 from the start position SP1 are formed in the pass P2. In the case of d=d2, as illustrated in FIGS. 8 and 9B, the overlap region R21 of the distance do=d1−d2 (for example, corresponding to 3 nozzle pitches) in the sub-scanning direction D3 are formed. In this case, all of the dots DT1 in the independent region of the first print region R1 are formed in the pass P1; the dots DT1 are formed in the pass P1 and the dots DT2 are formed in the pass P2 in the overlap region R21; and all of the dots DT2 in the independent region of the second print region R2 are formed in the pass P2. In the case of d=d3, as illustrated in FIGS. 8 and 9C, the overlap region R22 of the distance do=d1−d3 (for example, corresponding to 6 nozzle pitches) is formed in the sub-scanning direction D3. In the case of d=d4, as illustrated in FIG. 8, the overlap region R23 of the distance do=d1−d4 (for example, d1/2) is formed in the sub-scanning direction D3. Even in the case of d=d3 and d4, all of the dots DT1 in the independent region of the first print region R1 are formed in the pass P1; the dots DT1 are formed in the pass P1 and the dots DT2 are formed in the pass P2 in the overlap regions R22 and R23; and all of the dots DT2 in the independent region of the second print region R2 are formed in the pass P2.

The controller 10 determines whether the processes of S106 to S108 of FIG. 5 are performed on all of the CMYK data DA3 (S110). In a case in which the unprocessed CMYK data DA3 remains, the processes of S106 to S108 are repeated in each main scanning. In a case in which the processes of S106 to S108 are performed on all of the CMYK data DA3, the controller 10 ends the printing control process.

For example, as illustrated in FIG. 1, the RGB data DA2 in which the record density RD of the determination regions in the passes P1, P2, P3, and P4 are 0≤% RD<10%, 10%≤RD<60%, 60%≤RD<90%, and 90%≤RD≤100% is assumed to be input to the color conversion unit 42. Based on the RGB data DA2, the color conversion unit 42 generates the CMYK data DA3 including the CMYK data according to the first correspondence relation CO1 and the C2M2Y2K2 data according to the second correspondence relation CO2. The halftone processing unit 44 generates the halftone data DA4 corresponding to one-time main scanning in each main scanning.

Since the record density RD of the determination region based on the halftone data DA4 corresponding to one-time main scanning is 0%≤RD<10% in the pass P1, the distance d of the sub-scanning in S208 of FIG. 7 is the maximum d1 and the print regions R1 and R2 are not overlapped, as illustrated in FIGS. 1, 8, and 9A. The printing speed is maximized without overlap nozzles and the record density RD of the determination region in the pass P1 is the lower-density side from the first determination density TH1=10%. Therefore, even when a slight error occurs in the transport of the print substrate ME1, a stripe in the main scanning direction D2 does not occurs or is not conspicuous. In this way, the nozzles are efficiently used in a portion in which it is not necessary to overlap the nozzles in the print image.

Since the record density RD of the determination region in the subsequent pass P2 is 10%≤RD<60%, the distance d of the sub-scanning is d2 in S212 of FIG. 7. Therefore, as illustrated in FIGS. 1, 8, and 9B, the slight overlap region R21 occurs in the print regions R1 and R2. Since the record density RD of the determination regions in the pass P2 is the lower-density side from the second determination density TH1=60%, the banding by the transport error of the print substrate ME1 is suppressed, and thus a reduction of the printing speed is suppressed to some extent. The halftone data of the overlap region R21 is the halftone data from the CMYK data according to the first correspondence relation CO1, as in the halftone data of the independent region of the first print region R1.

The record density RD of the determination region in the subsequent pass P3 is 60%≤RD<90%, the distance d of the sub-scanning is d3 in S216 of FIG. 7, the overlap region R22 occurring in the print regions R1 and R2 is broader than the overlap region R21, as illustrated in FIGS. 1, 8, and 9C. Accordingly, the conspicuousness of the dark stripes BA1 illustrated in FIG. 4D is suppressed. Since the halftone data of the overlap region R22 is substituted with the halftone data concealed from the C2M2Y2K2 data according to the second correspondence relation CO2, the dark stripes of the entire overlap region R22 are suppressed.

The record density RD of the determination region in the subsequent pass P4 is 90%≤RD≤100%, the distance d of the sub-scanning is d4 in S218 of FIG. 7, the overlap region R23 occurring in the print regions R1 and R2 is broader than the overlap region R22, as illustrated in FIGS. 1 and 8. Accordingly, the banding in the case in which the determination regions have considerably high density is suppressed. Since the halftone data of the overlap region R23 is substituted with the halftone data concealed from the C2M2Y2K2 data according to the second correspondence relation CO2, the darkness of the entire overlap region R23 is adjusted to appropriate thinness.

As described above, the distance d of the sub-scanning is dynamically changed according to the record density RD of the determination region R30 on the side of the second print region R2 in the main scanning direction D2 in the first print region R1, and thus the number of overlap nozzles, that is, the overlap of the print regions R1 and R2 in the sub-scanning direction D3, is dynamically changed. For example, in a portion with low density in a print image, an improvement in a printing speed can be realized due to a loss of the overlap nozzles. In a portion with intermediate density in a print image, an improvement in a printing speed and suppression of banding can be balanced by providing some overlap nozzles. In a portion with high density in a print image, an independent region and color can be arranged by applying the second correspondence relation CO2 for a link portion to an overlap portion and suppression of banding can be improved by increasing the number of overlap nozzles.

Accordingly, according to the present technology, the overlap of the print regions R1 and R2 can be changed to suppress the banding and improve the printing speed, and thus it is possible to improve the printing speed while suppressing the banding.

(6) Modification Examples

Various modification examples of the invention is considered.

At least some of the processes illustrated in FIGS. 5 and 7 may be performed by the host apparatus HT1. For example, in a case in which the host apparatus HT1 performs the processes up to the halftone process and transmits the halftone data and the distance d of the sub-scanning to the printing apparatus 1, the printing apparatus 1 may receive the halftone data and the distance d of the sub-scanning and deliver the halftone data and the distance d of the sub-scanning to the signal transmission unit 45. In this case, the printing apparatus 1 may not include at least some of the resolution conversion unit 41, the color conversion unit 42, the dot distribution unit 43, and the halftone processing unit 44. In a case in which the host apparatus HT1 performs the processes up to the color conversion process and transmits the CMYK data DA3 to the printing apparatus 1, the printing apparatus 1 may receive the CMYK data DA3 and deliver the CMYK data DA3 to the dot distribution unit 43 or the halftone processing unit 44.

The arrangement direction D1 of the nozzles of the nozzle line may be deviated in the sub-scanning direction D3. When θ is an angle formed by the arrangement direction D1 and the sub-scanning direction D3, a pitch of the nozzles in the sub-scanning direction D3 is Np·cosθ.

The determination region may be a region including at least a part of the first print region R1 or may include a region, such as a region which becomes the second print region R2, outside the first print region R1. When the print data DA1, such as a region which becomes the second print region R2, outside the first print region R1 is used, determination precision of a risk of banding can be improved.

In the above-described embodiment, the color conversion unit 42 generates the C2M2Y2K2 data in its background according to the LUT 150. However, the color conversion unit 42 may first generate the CMYK data without generating the C2M2Y2K2 data according to an LUT which does not define the second correspondence relation CO2 and defines the first correspondence relation CO1. In this case, the color conversion unit 42 may convert the RGB data DA2 of the overlap region R20 into the C2M2Y2K2 data according to the LUT which defines the second correspondence relation CO2 in response to a request from the halftone processing unit 44 after the processes of S202 to S218 of FIG. 7. When the dot distribution unit 43 generates dot data from the C2M2Y2K2 data of the overlap region R20 as necessary and the halftone processing unit 44 generates the halftone data from the C2M2Y2K2 data or the dot data, the data substitution process of S220 of FIG. 7 can be performed.

The above-described processes may be appropriately changed, for example, by exchanging the sequence of the processes. For example, the order of the determination processes of S206, S210, and S214 in the halftone process of FIG. 7 can be changed. In a case in which the sequence is reversed and a case in which a determination region of RD≥TH3 is present in S214, d=d4 can be set in S218. In a case in which the determination region of RD≥TH3 is not present and a case in which a determination region of RD≥TH2 is present in S210, d=d3 can be set in S216. In a case in which the determination region of RD≥TH2 is not present and a case in which a determination region of RD≥TH1 is present in S206, d=d2 can be set in S212. In a case in which the determination region of RD≥TH1 is not present, d=d1 can be set in S208.

Figure 12A:
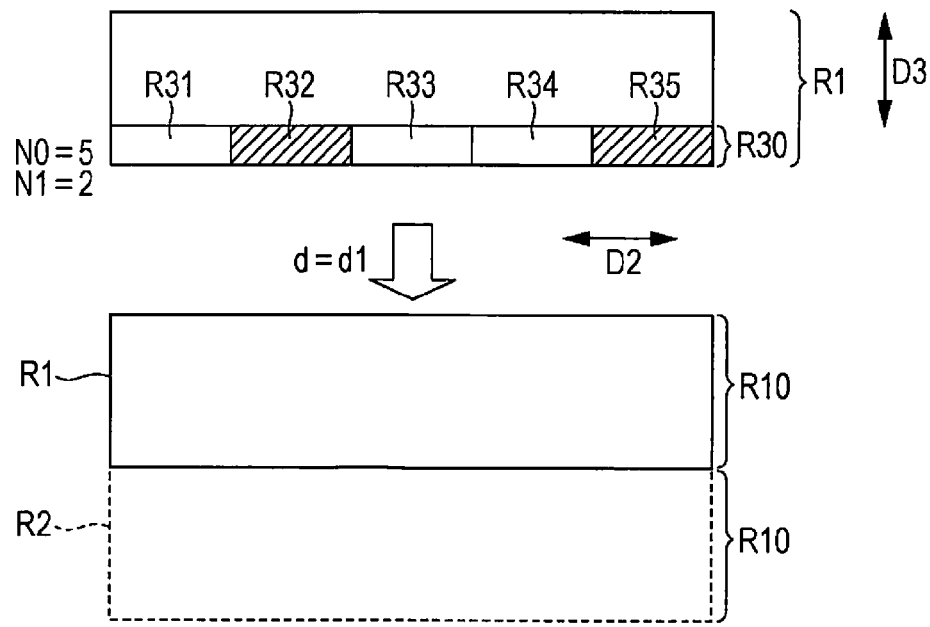
FIG. 12A is a diagram schematically illustrating an example in which the first and second print regions are not overlapped in a case in which high-density determined regions are not continuous.
Figure 12B:
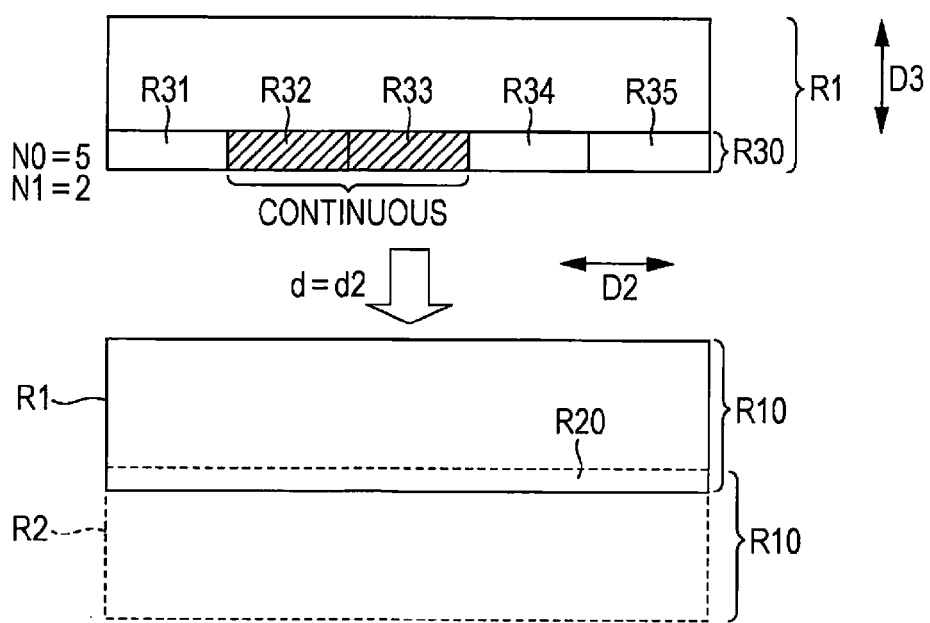
FIG. 12B is a diagram schematically illustrating an example in which the first and second print regions are overlapped in a case in which high-density determined regions are continuous.

Whether the record density RD is the higher-density side from the determination standard may be determined by determining whether the determination regions with the record density RD equal to or greater than the determination density among N0 determination regions R31 to R35 are present as N1 or more determination regions continuous in the main scanning direction D2 (where N1 is an integer equal to or greater than 1 and less than N0), as illustrated in FIGS. 11, 12A, and 12B. In the halftone process illustrated in FIG. 11, processes of S302 to S314 are performed instead of the processes of S206 to S218 illustrated in FIG. 7. In a case in which the number of determination regions continuous in the main scanning direction D2 is less than N1, the risk of banding is low even when there is the determination region with the record density RD equal to or greater than the determination density. Therefore, a one-time feeding amount of the print substrate can be set to be large, and thus it is possible to improve the printing speed.

When the record density RD of the determination regions R31 to R35 is acquired in S204 illustrated in FIG. 11, the halftone processing unit 44 first determines whether the determination regions with the record density RD equal to or greater than the third determination density TH3 are present as N1 or more determination regions continuous in the main scanning direction D2 (S302). The determination of S302 is determination regarding whether the acquired record density RD is the higher-density side from the third determination standard. In a case in which N1 or more determination regions of RD≥TH3 are continuous, the halftone processing unit 44 sets the distance d of the sub-scanning to d4=d1/2 so that the distance do in which the print regions R1 and R2 are overlapped is maximized (S304), and then the process proceeds to S220.

In a case in which the halftone processing unit 44 determines that determination regions with the record density RD equal to or greater than the third determination density TH3 are not present as N1 or more continuous determination regions, the halftone processing unit 44 determines whether the determination regions with the record density RD equal to or greater than the second determination density TH2 are present as NI or more determination regions continuous in the main scanning direction D2 (S306). The determination of S306 is determination regarding whether the acquired record density RD is the higher-density side from the second determination standard. In a case in which N1 or more determination regions of RD≥TH2 are continuous, the halftone processing unit 44 sets the distance d of the sub-scanning to d3 longer than d4 (S308), and then the process proceeds to S220.

In a case in which the halftone processing unit 44 determines that the determination regions with the record density RD equal to or greater than the second determination density TH2 are not present as N1 or more continuous determination regions, the halftone processing unit 44 determines whether the determination regions with the record density RD equal to or greater than the first determination density TH1 are present as N1 or more determination regions continuous in the main scanning direction D2 (S310). The determination of S310 is determination regarding whether the acquired record density RD is the higher-density side from the first determination standard. In a case in which N1 or more determination regions of RD≥TH1 are continuous, the halftone processing unit 44 sets the distance d of the sub-scanning to d2 longer than d3 (S312), and then the process proceeds to S222. In a case in which the halftone processing unit 44 determines that the determination regions with the record density RD equal to or greater than the first determination density TH1 are not present as N1 or more continuous determination regions, the halftone processing unit 44 sets the distance d of the sub-scanning to d1 so that the print regions R1 and R2 are not overlapped (S314), and then the process proceeds to S222.

FIGS. 12A and 12B schematically illustrate a form in which the overlap of the print regions R1 and R2 is changed according to the record density RD of the determination regions R31 to R35 in a case of N0=5 and N1=2. For example, of the determination regions R31 to R35 illustrated in FIG. 12A, the record density RD of the determination regions R31, R33, and R34 is assumed to be less than the first determination density TH1=10% and the determination regions R32 and R35 are assumed to satisfy RD≥TH1. In this case, since the determination regions of RD≥TH1 are not continuous, the risk of banding is determined to be low and d=d1 is set so that the print regions R1 and R2 are not overlapped. Further, of the determination regions R31 to R35 illustrated in FIG. 12B, the determination regions R31, R34, and R35 are assumed to satisfy RD<TH1 and the determination regions R32 and R33 are assumed to satisfy RD≥TH1. In this case, since the determination regions of RD≥TH1 are continuous, the risk of banding is determined to be high and d=d2 is set so that the print regions R1 and R2 are partially overlapped.

The determination performed using the second determination density TH2 or the third determination density TH3 can be said to be similar.

As described above, the overlap of the print regions R1 and R2 can be changed to suppress the banding and improve the printing speed even in the examples illustrated in FIGS. 11, 12A, and 12B. Thus, it is possible to improve the printing speed while suppressing the banding.

In the halftone process of FIG. 11, the sequence of the determination processes of S302, S306, and 5310 can also be changed.

Incidentally, the present technology can be applied not only to the band printing in which all of the dots of the independent region R10 are formed by one-time main scanning but also to a printing scheme such as pseudo-band printing in which all of the dots of the independent region R10 are formed by M-time main scanning (where M is an integer equal to or greater than 2). First, an operation example of the pseudo-band printing rather than the overlap printing will be described with reference to FIG. 13. To facilitate the description, the head 61 illustrated in FIG. 13 is assumed to include a nozzle line 68 in which Nn=4 nozzles 64 are arranged in the arrangement direction D1 at a predetermined pitch Np.

The pseudo-band printing rather than the overlap printing is a printing scheme of forming all of the dots of the plurality of nozzles 64 and a corresponding one band by moving the head 61 relative to the print substrate ME1 twice or more in the main scanning direction D2. In the example of FIG. 13, a dot DT to be formed for half of a pixel PX included in a band 31 is formed in first main scanning in a forward direction D2a. After the print substrate ME1 is subjected to sheet feeding by a distance of ½ of the nozzle pitch Np, a dot DT to be formed for the remaining half of the pixel included in the band B1 is formed in second main scanning in a backward direction D2b. After the print substrate ME1 is subjected to sheet feeding by a distance of {Nn−(½)}×Np, a dot DT to be formed for half of a pixel PX included in a band B2 is formed in third main scanning in the forward direction D2a. After the print substrate ME1 is subjected to sheet feeding by a distance of (½)×Np, a dot DT to be formed for the remaining half of the pixel included in the band 132 is formed in fourth main scanning in the backward direction D2b. After the print substrate ME1 is subjected to sheet feeding by a distance of {Nn−(½)}×Np, a dot DT to be formed for half of a pixel PX included in a band B3 is formed in fifth main scanning in the forward direction D2a. Subsequently, the same operations are performed. In a case in which uni-directional printing is performed, odd and even dots may be formed and only the main scanning of the forward direction D2a may be performed. A pixel pitch Yp in the sub-scanning direction D3 at the time of the pseudo-band printing is, for example, (½)×Np.

In a case in which the pseudo-band printing is applied to the present technology, the sub-scanning of the distance d longer than the pitch Np of the nozzles 64 of the nozzle line

68 in the sub-scanning direction D3 is not sub-scanning of ½ of the nozzle pitch Np but sub-scanning of d={Nn−(½)}×Np. For example, since the sub-scanning of d={Nn−(½)}×Np is interposed between the second main scanning and the third main scanning, the second main scanning performed immediately previously is the first main scanning and the third main scanning performed immediately previously is the second main scanning in the sub-scanning. The band B1 in which the print image IM1 is formed at the time of the first main scanning is the first print region and the band B2 in which the print image IM1 is formed at the time of the second main scanning is the second print region.

In accordance with the flows illustrated in FIGS. 7 and 11, control can be performed to change the distance d of the sub-scanning according to the record density RD. Here, since all of the dots of the independent region of the first print region are formed in M-time main scanning and all of the dots of the independent region of the second print region are formed in M-time main scanning, halftone data corresponding to M-time main scanning partitioned by the sub-scanning of d={Nn−(½)}×Np may be generated in S202. The halftone data becomes halftone data of the first print region in the processes of FIGS. 7 and 11 and the processes subsequent to S204 can be used.

Figure 14A:
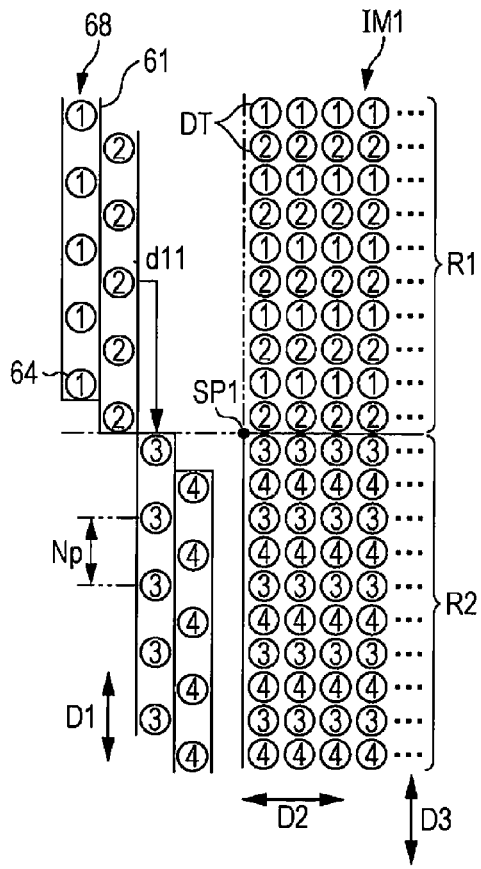
FIGS. 14A to 14C are diagrams schematically illustrating another example in which the first and second print regions are overlapped when the distance of the sub-scanning is changed.
Figure 14B:
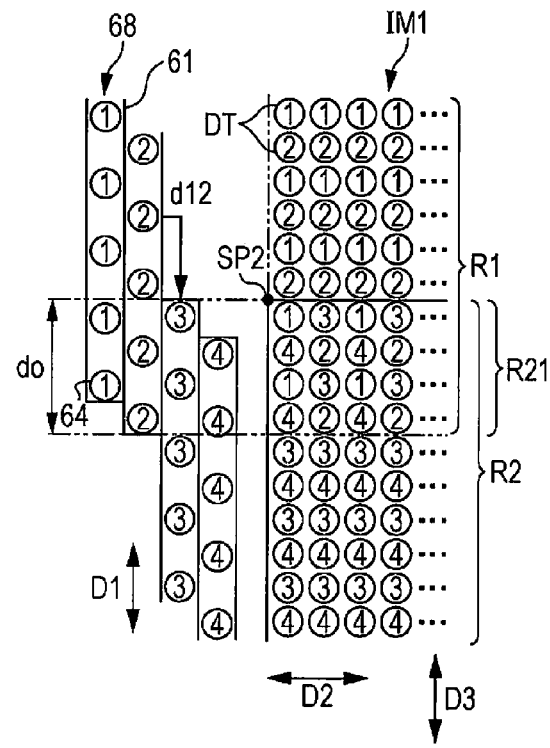
Figure 14C:
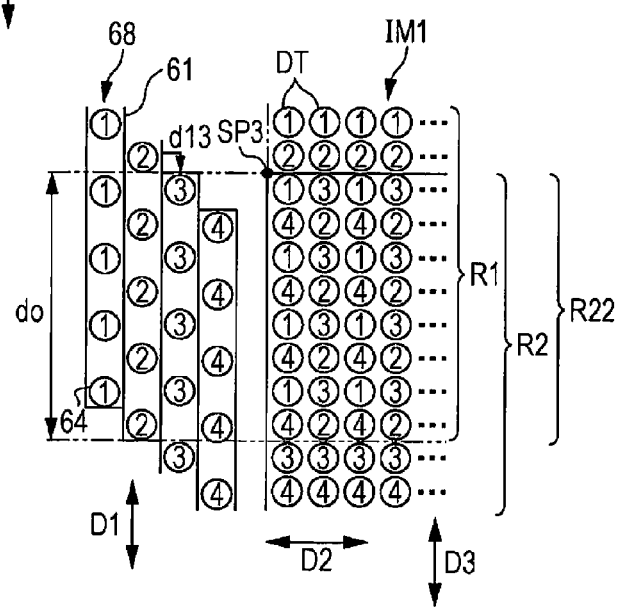

FIGS. 14A to 14C schematically illustrate an overlap of the print regions R1 and R2 when the distance d of the sub-scanning is changed by setting the second main scanning to the first main scanning and setting the third main scanning to the second main scanning. The dots DT and the nozzles 64 in the first, second, third, and fourth main scanning are indicated by circular numerals 1, 2, 3, and 4, respectively.

FIG. 14A illustrates an example in which a distance d11 of the sub-scanning between the print regions R1 and R2 is set to {Nn−(½)}×Np so that the print regions R1 and R2 are not overlapped in a case in which the record density RD of the determination region is the lower-density side from the first determination standard. In this case, all of the dots in odd rasters of the first print region R1 in the sub-scanning direction D3 are formed in the first main scanning and all of the dots in even rasters of the first print region R1 are formed in the second main scanning. All of the dots in odd rasters of the second print region R2 are formed in the third main scanning and all of the dots in even rasters of the second print region R2 are formed in the fourth main scanning.

FIG. 14B illustrates an example in which a distance d12 of the sub-scanning is set to {Nn−(½)−2}×Np so that the print regions R1 and R2 are overlapped by 2 nozzle pitches in a case in which the record density RD of the determination region is the higher-density side from the first determination standard and the lower-density side from the second determination standard. In this case, dots are formed in the independent region of the first print region R1 in the first and second main scanning and dots are formed in the independent region of the second print region R2 in the third and fourth main scanning. Further, dots are formed in odd rasters of the overlap region R21 in the sub-scanning direction D3 in the first and third main scanning performed by interposing the sub-scanning of the distance d12, and dots are formed in even rasters of the overlap region R21 in the second and fourth main scanning performed by interposing the sub-scanning of the distance d12.

FIG. 14C illustrates an example in which a distance d13 of the sub-scanning is set to {Nn−(½)−4}×Np so that the print regions R1 and R2 are overlapped by 4 nozzle pitches in a case in which the record density RD of the determination region is the higher-density side from the second determination standard. Even this case, dots are formed as in the case of the sub-scanning of the distance d12.

As described above, even in the case in which the pseudo-band printing is performed, the overlap of the print regions R1 and R2 can be changed to suppress the banding and improve the printing speed, and thus it is possible to improve the printing speed while suppressing the banding.

Further, some of the processes of S206 to S220 illustrated in FIG. 7 may be omitted or some of the processes of S302 to S314 and S220 illustrated in FIG. 11 may be omitted.

Figure 15A:
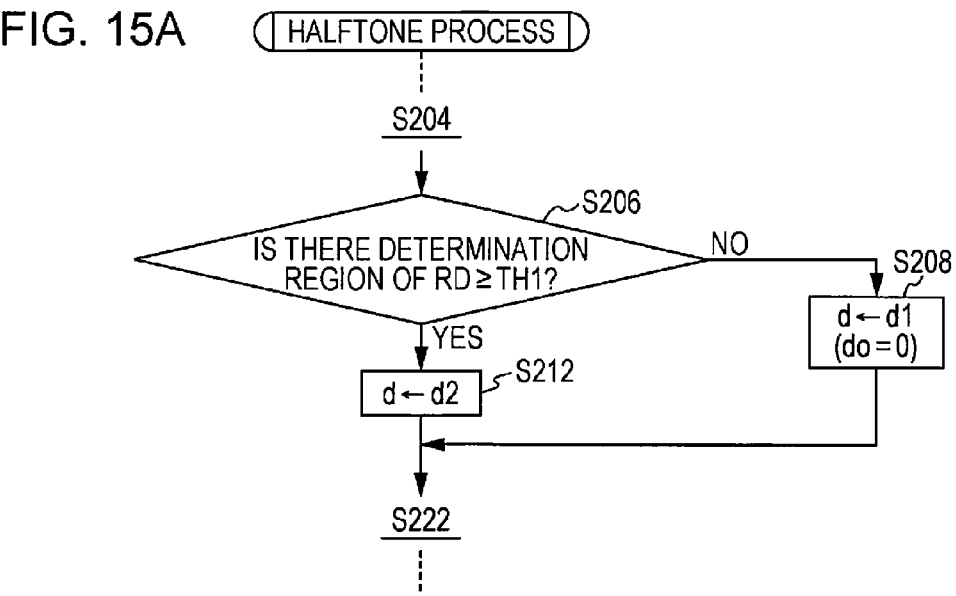
FIGS. 15A and 15B are flowcharts illustrating other examples of the halftone process.

FIG. 15A illustrates an example of the halftone process in which the processes of S210 and S214 to S220 illustrated in FIG. 7 are omitted. In this example, when the record density RD of the determination regions R31 to R35 is acquired in S204, the halftone processing unit 44 determines whether there is the determination region of RD≥TH1 (S206). In a case in which all of the determination regions R31 to R35 satisfy RD<TH1 and have the lower-density side, the halftone processing unit 44 sets the distance d of the sub-scanning to d1 so that the distance do in which the print regions R1 and R2 are overlapped is 0 by design (S208), and then the process proceeds to S222. Accordingly, in a case in which the risk of banding is low, the printing speed is improved. Conversely, in a case in which at least one of the determination regions R31 to R35 satisfies RD≥TH1 and has the higher-density side, the halftone processing unit 44 does not further sort the condition and sets the distance d of the sub-scanning to d2 shorter than d1 (S212), and then the process proceeds to S222. Accordingly, the banding caused due to a transport error of the print substrate is suppressed. Accordingly, even in the example illustrated in FIG. 15A, it is possible to improve the printing speed while suppressing the banding.

In the halftone process illustrated in FIG. 11, the processes of S302 to S308 and S220 may be omitted. In this case, the halftone processing unit 44 determines whether the determination regions of RD≥TH1 are continuous as N1 or more determination regions (S310) after the process of S204. In a case in which the determination regions are continuous as N1 or more determination regions, d=d2 is set (S312). In a case in which the determination regions are not continuous as N1 or more determination regions, d=d1 is set (S314).

Figure 15B:
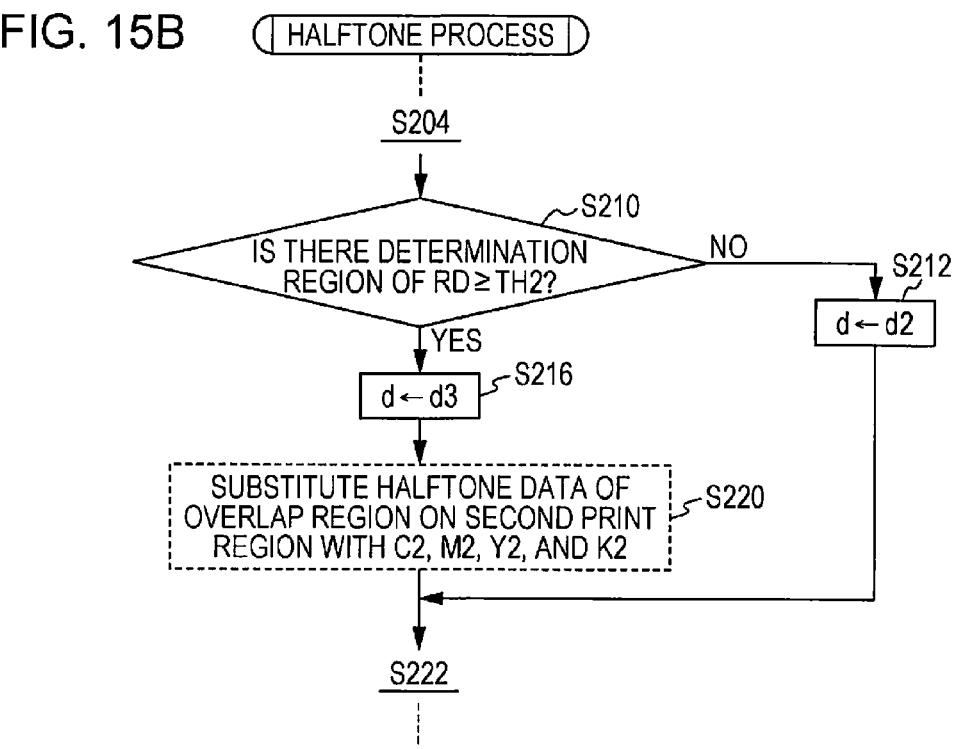

FIG. 15B illustrates an example of the halftone process in which the processes of S206 to S208, S214, and S218 illustrated in FIG. 7 are omitted. In this example, after the process of S204, the halftone processing unit 44 determines whether there is the determination region of RD≥TH2 (S210). In a case in which all of the determination regions R31 to R35 satisfy RD<TH2 and have the lower-density side, the halftone processing unit 44 sets the distance d of the sub-scanning to d2 so that the print regions R1 and R2 are slightly overlapped (S212), and then the process proceeds to S222. Accordingly, it is possible to improve the printing speed while suppressing the banding caused due to a transport error of the print substrate. Conversely, in a case in which at least one of the determination regions R31 to R35 satisfies RD≥TH2 and has the higher-density side, the halftone processing unit 44 does not further sort the condition and sets the distance d of the sub-scanning to d3 shorter than d2 (S216), and then the process proceeds to S220 or S222. Accordingly, the conspicuousness of the dark stripes BA1 occurring in the edge portions f the overlap region R20 is suppressed. Further, it is preferable to perform the process of S220 since the dark stripes of the entire overlap region are suppressed. However, even when the process of S220 is not performed, it is possible to obtain the advantage of suppressing the conspicuousness of the dark stripes BA1 occurring in the edge portions of the overlap region. Accordingly, even in the example illustrated in FIG. 15B, it is possible to improve the printing speed while suppressing the banding.

In the halftone process illustrated in FIGS. 11, S302 to S304, S310, and S314 may be omitted and the process of S220 may be further omitted. In this case, the halftone processing unit 44 determines whether the determination regions of RD≥TH2 are continuous as N1 or more determination regions (S306) after the process of S204. In a case in which the determination regions are continuous as N1 or more determination regions, d=d3 is set (S308). In a case in which the determination regions are not continuous as N1 or more determination regions, d=d2 is set (S312).

(7) Conclusion

According to the invention, as described above, it is possible to provide the technology capable of improving a printing speed while suppressing banding according to various aspects. Of course, even in technologies in which constituent requisites related to dependent aspects of the invention are not included and only constituent requisites related to independent aspects of the invention are included, the above-described basic operations and advantages can be obtained.

Configurations obtained by substituting or combining the configurations disclosed in the above-described embodiment and modification examples and configurations obtained by substituting and combining the configurations disclosed in technologies of the related arts and the above-described embodiment and modification examples can also be embodied. The invention also includes such configurations.

This application claims priority under 35 U.S.C. §119 to Japanese Patent Application No. 2015-133888, filed Jul. 2 2015. The entire disclosure of Japanese Patent Application No. 2015-133888 is hereby incorporated herein by reference.

What is claimed is:

1. A printing control device for a printing unit that forms a print image corresponding to print data by performing main scanning to move a nozzle line, in which a plurality of nozzles are arranged in a different direction from a main scanning direction, relative to a print substrate in the main scanning direction and by performing sub-scanning to move the print substrate relative to the nozzle line in a sub-scanning direction:
wherein main scanning performed two times by interposing sub-scanning of a distance d longer than a pitch of nozzles of the nozzle line in the sub-scanning direction is referred to as first main scanning and second main scanning, a region in which a print image is formed at a time of the first main scanning is referred to as a first print region, and a region in which the print image is formed at a time of the second main scanning is referred to as a second print region, and
wherein the printing control device comprises:
a record density acquisition unit that acquires record density of the print image in a determination region including at least a part of the first print region based on the print data; and
a sub-scanning control unit that changes an overlap between the first and second print regions in the sub-scanning direction by changing the distance d of the sub-scanning according to the acquired record density.

2. The printing control device according to claim 1, wherein the sub-scanning control unit determines whether the record density acquired by the record density acquisition unit is a higher-density side from a first determination standard, controls the distance d of the sub-scanning such that the first and second print regions are partially overlapped in the sub-scanning direction in a case in which the sub-scanning control unit determines that the record density is the higher-density side, and controls the distance d of the sub-scanning such that the first and second print regions are not overlapped in the sub-scanning direction in a case in which the sub-scanning control unit determines that the record density is not the higher-density side.

3. The printing control device according to claim 2, wherein based on the print data, the record density acquisition unit acquires the record density of the print image in the determination region in which a region on a side of the second print region in the main scanning direction in the first print region is divided into N0 determination regions (where N0 is an integer equal to or greater than 2) in the main scanning direction, and
wherein the sub-scanning control unit determines whether the determination regions in which the record density of the print image is equal to or greater than first determination density are present as N1 continuous determination regions or more (where N1 is an integer equal to or greater than 1 and less than N0) in the main scanning direction among the N0 determination regions, controls the distance d of the sub-scanning such that the first and second print regions are partially overlapped in the sub-scanning direction in a case in which the N1 continuous determination regions or more are determined to be present, and controls the distance d of the sub-scanning such that the first and second print regions are not overlapped in the sub-scanning direction in a case in which the N1 continuous determination regions or more are determined not to be present.

4. The printing control device according to claim 1, wherein the sub-scanning control unit includes a partial overlap sub-scanning control unit that controls the distance d of the sub-scanning such that the first and second print regions are partially overlapped in the sub-scanning direction and do is assumed to be a distance in which the first and second print regions are overlapped in the sub-scanning direction, and
wherein the partial overlap sub-scanning control unit determines whether the record density acquired by the record density acquisition unit is a higher-density side from a second determination standard and controls the distance d of the sub-scanning such that the distance do in a case in which the record density is the higher-density side is longer than the distance do in a case in which the record density is not the higher-density side.

5. The printing control device according to claim 4, wherein based on the print data, the record density acquisition unit acquires the record density of the print image in the determination region in which a region on a side of the second print region in the main scanning direc- tion in the first print region is divided into N0 deter- mination regions (where N0 is an integer equal to or greater than 2) in the main scanning direction, and
wherein the partial overlap sub-scanning control unit determines whether the determination regions in which the record density of the print image is equal to or greater than second determination density are present as N2 continuous determination regions or more (where N2 is an integer equal to or greater than 1 and less than N0) in the main scanning direction among the N0 determination regions and controls the distance d of the sub-scanning such that the distance do in a case in which the N2 determination regions or more are determined to be present is longer than the distance do in a case in which the N2 determination regions or more are determined not to be present.

6. The printing control device according to claim 4, wherein the sub-scanning control unit determines whether the record density acquired by the record density acquisition unit is a higher-density side from the first determination standard on a lower-density side from the second determination standard, the partial overlap sub-scanning control unit controls the distance d of the sub-scanning in a case in which the sub-scanning control unit determines that the record density is the higher-density side, and the partial overlap sub-scanning control unit controls the distance d of the sub-scanning such that the first and second print regions are not overlapped in the sub-scanning direction in a case in which the sub-scanning control unit determines that the record density is not the higher-density side.

7. The printing control device according to claim 1, further comprising:
 a color conversion unit that performs color conversion on the print data according to at least a first correspondence relation; and
 a region printing control unit that causes the printing unit to form the print image of a region corresponding to each main scanning based on the print data subjected to the color conversion,
 wherein the region printing control unit performs control such that the print image is formed based on the print data subjected to the color conversion by the color conversion unit according to the first correspondence relation in a case in which the record density acquired by the record density acquisition unit is not the higher-density side from the second determination standard in a region in which the first and second print regions are overlapped in the sub-scanning direction, and performs control such that the print image is formed based on the print data subjected to the color conversion by the color conversion unit according to a second correspondence relation different from the first correspondence relation in a case in which the record density acquired by the record density acquisition unit is determined to be the higher-density side from the second determination standard.

8. The printing control device according to claim 7, wherein record density of ink expressed by the second correspondence relation is equal to or less than record density of ink expressed by the first correspondence relation in a case in which the same print data is subjected to the color conversion.

9. A printing control method performed by a printing unit that forms a print image corresponding to print data by performing main scanning to move a nozzle line, in which a plurality of nozzles are arranged in a different direction from a main scanning direction, relative to a print substrate in the main scanning direction and by performing sub-scanning to move the print substrate relative to the nozzle line in a sub-scanning direction: the method comprising:
 referring to main scanning performed two times by interposing sub-scanning of a distance d longer than a pitch of nozzles of the nozzle line in the sub-scanning direction as first main scanning and second main scanning, a region in which the print image is formed at a time of the first main scanning is referred to as a first print region, and a region in which the print image is formed at a time of the second main scanning is referred to as a second print region;
 acquiring record density of the print image in a determination region including at least a part of the first print region based on the print data; and
 changing an overlap between the first and second print regions in the sub-scanning direction by changing the distance d of the sub-scanning according to the acquired record density.

* * * * *